US012799928B2

(12) United States Patent
Wallace et al.

(10) Patent No.: US 12,799,928 B2
(45) Date of Patent: Nov. 17, 2026

(54) DYNAMIC FLUID PROPORTIONING AND INFINITELY VARIABLE RATIOS AND FLOWS FROM FIXED RATIO PISTON PROPORTIONING PUMPS

(71) Applicants: Luke Wallace, Denver, CO (US); Tyler Hawker, Timnath, CO (US)

(72) Inventors: Luke Wallace, Denver, CO (US); Tyler Hawker, Timnath, CO (US)

(73) Assignee: Luke Wallace, Johnstown, CO (US)

(*) Notice: Subject to any disclaimer, the term of this patent is extended or adjusted under 35 U.S.C. 154(b) by 276 days.

(21) Appl. No.: 18/622,899

(22) Filed: Mar. 30, 2024

(65) Prior Publication Data

US 2024/0328406 A1 Oct. 3, 2024

Related U.S. Application Data

(60) Provisional application No. 63/456,019, filed on Mar. 31, 2023.

(51) Int. Cl.

| | |
|---|---|
| ***F04B 13/02*** | (2006.01) |
| ***B01F 35/21*** | (2022.01) |
| ***B01F 35/22*** | (2022.01) |
| ***B01F 35/221*** | (2022.01) |
| ***F04B 49/24*** | (2006.01) |

(52) U.S. Cl.
CPC .......... *F04B 13/02* (2013.01); *B01F 35/2116* (2022.01); *B01F 35/2205* (2022.01); *B01F 35/2217* (2022.01); *F04B 49/24* (2013.01); *F04B 2201/0201* (2013.01)

(58) Field of Classification Search
CPC .. F04B 13/02; F04B 49/24; F04B 2201/0201; B01F 35/2116; B01F 35/2205; B01F 35/2217; B01F 35/8821; B01F 35/88221
USPC .......................................................... 701/408
See application file for complete search history.

*Primary Examiner* — Maceeh Anwari
(74) *Attorney, Agent, or Firm* — H. Brock Kolls

(57) ABSTRACT

The present invention relates to a system and method dispensing flows of two or more fluid streams in varying ratios from a fixed ratio piston proportioning pump. The method comprises determining a desired volume of fluid to dispense, determining the total piston displacement amount required to dispense the desired volume of the fluid, measuring a piston displacement amount as the piston moves to determine when the total piston displacement amount has been achieved, and bypassing the fluid at the ingress port or the egress port, preventing the dispense of the fluid while the piston continues to move when the piston displacement amount reaches the total piston displacement amount. Exemplary embodiments include changing chamber volumes to change the ratiometric mixture of two or more fluid streams and using injected fluid as the motive force to move the piston back and forth within the cylinder.

20 Claims, 37 Drawing Sheets

A
B
308/30
Main Pump Unit
n1
n2
n3
114/116
122
124
112
Water
30
314

DYNAMIC FLUID PROPORTIONING AND INFINITELY VARIABLE RATIOS AND FLOWS FROM FIXED RATIO PISTON PROPORTIONING PUMPS

CROSS-REFERENCE TO RELATED APPLICATIONS

This application contains subject matter that is related to the subject matter of the following application. The below-listed application is hereby incorporated herein by reference in its entirety:

This is a U.S. non-provisional application that claims the benefit of a U.S. provisional application, Ser. No. 63/456,019, inventor Luke Wallace et al., entitled "SYSTEM AND METHOD OF CONTROLLING A MULTI-CHAMBER FIXED DISPLACEMENT PROPORTIONING PUMP", filed Mar. 31, 2023.

TECHNICAL FIELD OF THE INVENTION

This invention relates to methods of dispensing flows of one or more fluid streams in varying ratios from a fixed ratio piston proportioning pump.

BACKGROUND OF THE INVENTION

Before our invention, often several liquid or gaseous ingredients needed to be mixed into a large single batch for use. During use, if the entire batch was not used, the unused portion of the batch would need to be discarded. In this regard, ingredients would be wasted.

A shortcoming of mixing batches of ingredients and then having to discard unused portions is that often these mixtures are hazardous and, as such, hard to safely discard, requiring special handling to avoid harm to the environment and human health.

The present invention addresses the shortcomings of mixing and dispensing liquid ingredients on demand proportionally so that batching is not needed and there are no wasted ingredients. The present invention accomplishes this by providing a system and methods of dynamic fluid proportioning and infinitely variable ratios and flows from fixed ratio piston proportioning pumps and other advantages. For these reasons and shortcomings, as well as other reasons and shortcomings, there is a long-felt need that gives rise to the present invention.

SUMMARY OF THE INVENTION

The shortcomings of the prior art are overcome, and additional advantages are provided through the provision of a method of dispensing flows of one or more fluids in varying ratios from a fixed ratio, fixed displacement, and fixed flow piston proportioning pump. The method comprises the steps of determining a desired volume of a fluid to dispense. The fixed ratio piston proportioning pump comprises at least one cylinder, at least one piston, and a linkage that connects at one end to the piston. At least one chamber is formed within the cylinder for holding a fluid. Each of the chambers comprises an ingress port and an egress port. The linkage is coupled to a motive force in a manner that displaces the piston within the cylinder.

The method continues by determining the total piston displacement amount required to dispense the desired volume of the fluid and initiating the dispense of the fluid from the egress port by setting at least one bypass valve to a first state.

The method continues by measuring the piston displacement amount as the piston moves to determine when the total piston displacement amount has been achieved. And, bypassing the fluid at the ingress port or the egress port by setting at least one of the bypass valves to a second state, preventing the dispense of the fluid while the piston continues to move when the piston displacement amount reaches the total piston displacement amount.

Additional shortcomings of the prior art are overcome, and additional advantages are provided through the provision of a method of dispensing flows of one or more fluids in varying ratios from a fixed ratio, fixed displacement, and fixed flow piston proportioning pump. The method comprises the steps of configuring the size of more than one chamber to form, for each of the chambers, a chamber volume. The fixed ratio piston proportioning pump comprises at least one cylinder, at least one piston, and a linkage that connects at one end to the piston. Each of the chambers is formed within the cylinder for holding a fluid. Each of the chambers comprises an ingress port and an egress port. The linkage is coupled to a motive force in a manner that displaces the piston within the cylinder.

The method continues by determining the desired volume of a fluid to dispense and determining the total piston displacement amount required to dispense the desired volume of the fluid.

The method continues by mixing, in a ratiometric manner based on each of the chamber volumes, at least two separate streams of the fluid, by setting at least one bypass valve to a first state, causing at least two separate streams of the fluid to be dispensed from more than one of the chambers.

The method continues by measuring a piston displacement amount as the piston moves to determine when the total piston displacement amount has been achieved and bypassing the fluid at the ingress port or the egress port by setting at least one of the bypass valves to a second state, preventing dispense of the fluid while the piston continues to move when the piston displacement amount reaches the total piston displacement amount.

Additional shortcomings of the prior art are overcome, and additional advantages are provided through the provision of a method of dispensing flows of one or more fluids in varying ratios from a fixed ratio, fixed displacement, and fixed flow piston proportioning pump. The method comprises the steps of configuring the size of more than one chamber to form, for each of the chambers, a chamber volume. The fixed ratio piston proportioning pump comprises at least one cylinder and at least one piston. Each of the chambers is formed within the cylinder for holding a fluid. Each of the chambers comprises an ingress port and an egress port. The piston is displaced by the injection of the fluid into the chamber.

The method continues by mixing, in a ratiometric manner based on each of the chamber volumes, at least two separate streams of fluid, by setting at least one bypass valve to a first state, causing at least two separate streams of the fluid to be dispensed from more than one of the chambers, And, bypassing the fluid at the ingress port or the egress port by setting at least one of the bypass valves to a second state, preventing dispense of the fluid.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention, with advantages and features, refer to the description and the drawings.

BRIEF DESCRIPTION OF THE FIGURES

The foregoing and other objects, features, and advantages of the invention are apparent from the following detailed description taken in conjunction with the accompanying drawings, in which.

Figure 1A:
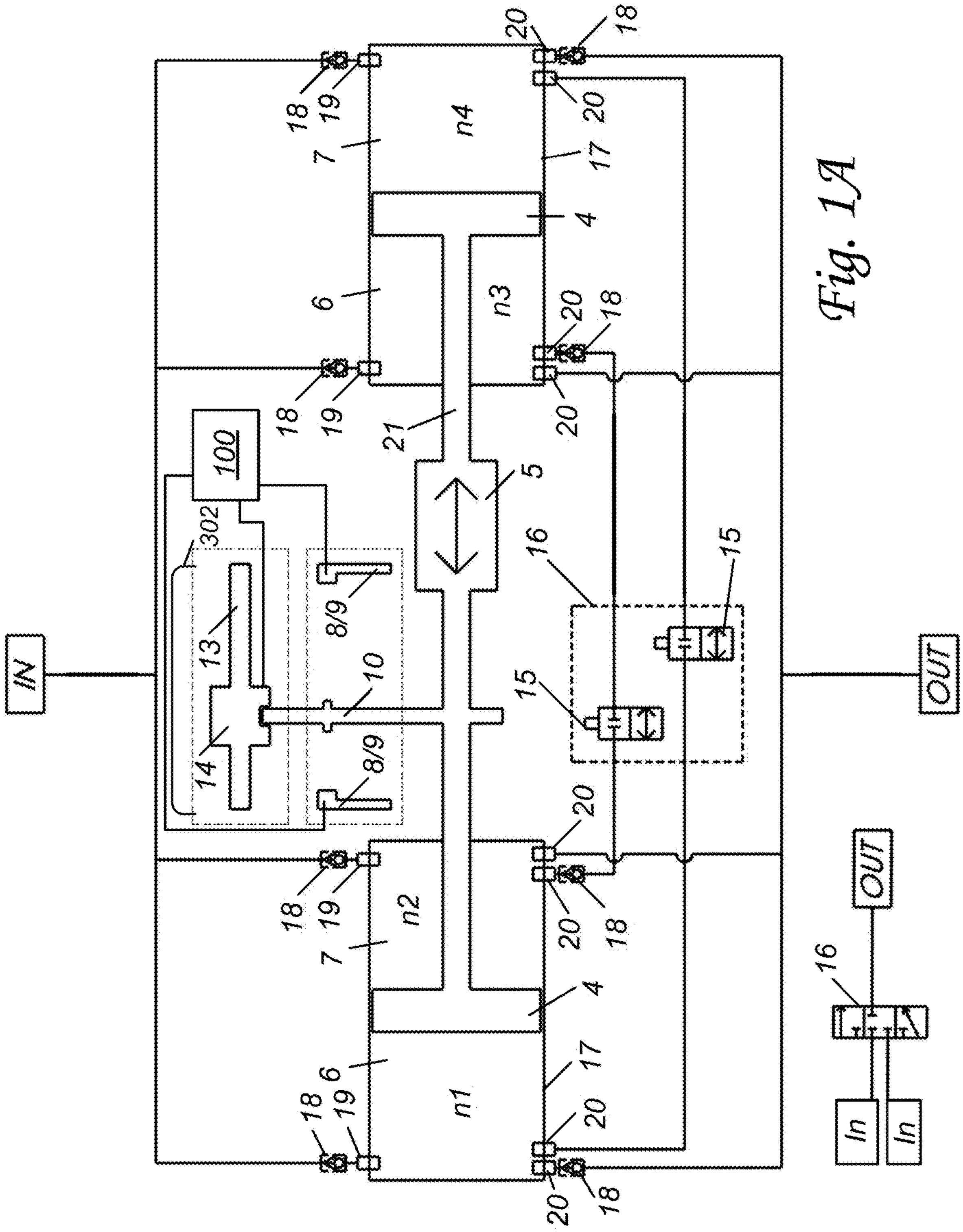
FIG. 1A illustrates one example of a multi-chamber fixed displacement piston proportioning pump where two pairs of chambers, each pair of different displacements, can be independently bypassed such that a bypassed chamber pair does not contribute to the output flow.

The detailed description explains the preferred embodiments of the invention, together with advantages and features, by way of example, with reference to the drawings.

DETAILED DESCRIPTION OF THE INVENTION

Given the wide-ranging applicability of the present invention to enhance the functionality of piston proportioning pumps, describing its full scope and impact presents a linguistic challenge. The systems and methods of the present invention not only introduce dynamic fluid ratio adjustments, flow rate variations, and displacement modifications but also enable a new standard of operational flexibility and precision across numerous applications. To this end, in an exemplary embodiment, the present invention combines a dynamic ratio control system (DRCS) with a fixed ratio, fixed displacement, fixed flow rate piston proportioning pump. For disclosure purposes, this can be referred to as DRCS-enabled, DRCS-enabled pump, or omitting the piston proportioning descriptors DRCS.

In an exemplary embodiment, DRCS is a method for controlling a fixed flow rate, fixed ratio, and fixed displacement piston proportioning pump. In operation, the DRCS can transform a fixed displacement piston proportioning pump with fixed attributes into a fixed displacement piston proportioning pump with variable attributes.

In the present invention, the term "bypass", or "bypass valve" is intended to mean a valve that can pass or abate fluid flow, most often electronically activated under the control of a control system such as a DRCS or other suitable control system. The bypass valve has at least two operating states. A first state can be closed and a second state can be open, or vice versa.

In the present invention, the terms "fixed displacement" and "variable displacement" refer to the swept volume of the various surfaces inside a piston proportioning pump, DRCS-enabled or not. Certain DRCS pumps can sweep displacement without actually contributing that swept volume into the output flow. The term "swept volume" means the amount of volume within the cylinder that the piston covers during motion.

In the present invention, the terms "fixed flow rate' and "variable flow rate" refer to whether the particular embodiment of the DRCS allows for the dynamic modulation (variable flow rate) of flow through a DRCS-enabled pump or not (fixed flow rate). In the context of either a DRCS-enabled pump or a fixed pump, the flow rate is defined as the total flow of fluid entering and leaving either kind of pump. Note that the fixed flow rate, in this case, has nothing to do with the pulsed output characteristic of piston pumps, even though DRCS can address that as well.

In the present invention, the term "ratiometric" or "ratiometrically" is intended to mean a system in which an output is directly proportional to the inputs.

In the present invention, the terms "fixed ratio" and "variable ratio" refer to mix ratios and not ratios of flows, even though ratios of flows abound in the present invention. The term ratiometric and references to ratios in the present invention, with the exception to ratios in DRCS, is a reference to the proportion of particular concentrations of particular fluid ingredients. There are configurations of DRCS that vary in ratio without changing flow.

In a plurality of exemplary embodiments of the present invention, several systems and methods for electronically controlling piston proportioning pump 40 that comprises one or more "chambers" (n1, n2, n3, nx . . . ). Each of the chambers has a chamber volume that, for disclosure purposes, can be represented by the nomenclature n1, n2, n3, nx . . . . The described systems and methods in the present invention are variations of the theme: a computer monitors the position of a piston within a chamber and bypasses that chamber's nominal output when an appropriate position has been reached to contribute (flow) or stop contributing (stop flow) the required proportion and/or total amount of the desired substance, such as fluid 30.

Essentially, if the position of a piston in a fixed displacement piston proportioning pump is known, then the volume that the piston has swept across is also known. The swept volume of a piston is defined by the mechanical dimensions of the piston pump and cannot be changed, making each pumping chamber its own positive displacement pump with a fixed ratio relative to other chambers/pistons. The pump's number of chambers, various cylinder diameters, stroke lengths, phases, routing, and all other fixed mechanical aspects of the pump are known quantities. If any single piston's position is known and that piston is mechanically coupled to other pistons, then those pistons' positions and, therefore, swept volumes are also known.

However, any piston proportioning pump's main advantage is its main disadvantage. Those same geometrically derived ratiometric properties never change-they are always fixed. A hypothetical 2:1:1 3-channel single-output piston proportioning pump can only pump four measures of the mixture at a 2:1:1 ratio with no provision for that ratio's modification for any reason. Attempting to run the same pump at 4:2:1 somehow would be some combination of wishful thinking and catastrophic mechanical failure.

The present invention leverages piston proportioning pumps' inherent consistency and easily manipulated ratiometric properties while simultaneously mitigating piston proportioning pumps' greatest weakness: their fixed ratios.

The present invention accomplishes this by monitoring the position of a piston or array of pistons and feeding that data into a computational model of the entire pump. The model is used to compute the positions that the pistons would need to occupy to have swept the requisite volumes necessary to comprise the commanded flow at the commanded ratio.

With regards to prior piston portioning pumps, deriving the positions of the pistons is completely useless in the context of piston proportioning pumps because the piston positions at ratios not mechanically intrinsic to a piston proportioning pump's mechanical geometry informed by the computational model are mutually exclusive to one another in the sense that the mechanical linkages holding the pistons in synchrony will not physically allow the pistons to occupy all the derived positions at the same time. As previously stated, that's exactly the point of any piston-proportional pump, including the one described herein. Put another way: looking back on the hypothetical aforementioned 2:1:1 pump, note that the same pump does actually sweep through 4:2:1 when the #1 piston and the #2 piston have made a complete transit, and the #3 piston is exactly halfway down, just never synchronously-which again, is exactly the point of piston proportioning pumps.

An advantage in the present invention, is that it removes the constraint that the physical linkage synchronizing the motion of all the pistons imposes on the ratiometric output of piston proportioning pumps without actually removing or modifying said linkage, thereby never actually jeopardizing the mechanical synchrony that makes piston proportioning pumps such an effective device.

For a given displacement of a piston or array of pistons coupled by a common linkage, the pump control system shuts off each piston as it passes through its switching point or points, as informed by the computational model, itself based on the fixed geometry of the pump. The system does this by "bypassing" the nominal flow of a particular chamber by stalling, mechanically decoupling, or effectively re-tasking the channel so it contributes or stops contributing to a mix or flow in a manner constructive to a commanded goal. The methods described can do so digitally, in real-time, and the fundamental attributes that comprise piston proportioning pumps' desirability as solutions remain unaffected and uncompromised.

In an exemplary embodiment, selective bypass is accomplished in such a way that 1) the motion of the pump doesn't need to be halted in order to stop one or more mixing chambers from dispensing, and 2) the swept volume and therefore displacement of all of the pumps in the array remains known and therefore metered.

Turning now to the drawings in greater detail, it will be seen that in FIG. 1A, there is illustrated one example of a multi-chamber fixed displacement piston proportioning pump where two pairs of chambers, each pair of different displacements, can be independently bypassed such that a bypassed chamber pair does not contribute to the output flow. In an exemplary embodiment, this is one example of a variable flow, fixed ratio displacement DRCS. In this regard, cylinder 17 is shown with either a linear scale 13 or simple limit switches/sensors 8/9 on each end of the stroke.

In the case of a linear scale 13 is used, coupler 14 can be secured to shaft connector 10 of piston 4. In operation, coupler 14 moves along linear scale 13 as piston 4 moves. A control system 100 can by way of a linear scale 13 measure the displacement and direction of motion of piston 4, effectively controlling the fixed displacement portioning pump 40. Coupler 14 and linear scale 13 can be secured in enclosure 22.

In an exemplary embodiment, the control system 100 can comprise a microcontroller, a memory, a displacement interface to interface with the limit switches/sensors 8/9, linear scale 13, and other displacement-determining devices and/or methods. The control system 100 can also comprise a motor control, solenoid valve controls, manifold controls such as manifold 16 and other manifolds, a display, a power supply, and a communication interface to data communicate locally and remotely with data processing resources such as servers, laptops, smartphones, tablets, and other data communicating devices. The microcontroller is operationally related to each of the memory, the displacement interface, the motor control, the solenoid valve controls, the manifold controls, the display, the power supply, and the communication interface. The memory can be encoded with instructions that, when executed by the microcontroller, effectuate the methods of the present invention.

In the case, limit switches/sensors 8/9 are used in a control system 100, they can be used to measure the end of a piston 4 stroke and the direction of motion of piston 4, effectively controlling the fixed displacement portioning pump 40. Limit switches/sensors 8/9 can be secured in an enclosure 11.

Piston 4 traverses cylinder 17 by way of displacement motor 5. Chambers 6 and 7 are formed on each side of piston 4. During operation, fluids are injected into chambers 6 and 7 when piston 4 is moving in a direction that increases the volume of either chamber 6 or 7. The fluid 30 can be the same or different.

In an exemplary embodiment, bypass valve 15 can be used to control the discharge of pump 40. In this regard, when bypass valve 15 is opened, the fluid transfers between chambers of equal displacements, while piston 4 moves back and forth within cylinder 17. With the bypass valve 15 open, no fluid is expelled from cylinder 17. A manifold 16 can be used to combine multiple similar or dissimilar fluid 30 types and/or output flows into a mixed output.

When bypass valve 15 is closed, fluid 30 is expelled through egress port 20 from either chamber 6 or 7 as the piston 4 moves in a direction that reduces the volume of either chamber 6 or 7.

In an exemplary embodiment, a control system 100 to control the activation and/or direction of motor 5, as well as measure the displacement of linkage 21, also referred to as linkage 21 or piston linkage 21. For disclosure purposes, motor 5 can be referred to as a motive force.

In the case of the linear scale 13, the computer can actuate bypass at any point during a single stroke. In the case of the limit switches, the computer can actuate bypass in terms of multiples of whole transits of the piston or an array of pistons.

In an exemplary embodiment, one or more check valves 18 can be utilized to limit the flow of the fluid to a specific direction through an interconnected ingress port 19, the egress port 20, tubes, conduits, couplings, plumbing, pipes, and other fitments.

In an exemplary embodiment, double-acting pumping cylinder 17 has a solenoid bypass valve 15 that opens a fluid connection between both chamber 6/7 sides on both sides of a pumping piston 4 so that piston 4 can continue moving through its stroke without pumping anything. A solenoid bypass valve 15 isolates the pump when it is in bypass, forcing all the fluid to recirculate within the pump between the chambers 6/7 through the bypass valve. Appropriately sized check valves 18 can also be used for this purpose. A single-acting cylinder 17 can also be bypassed in this way.

Figure 1B:
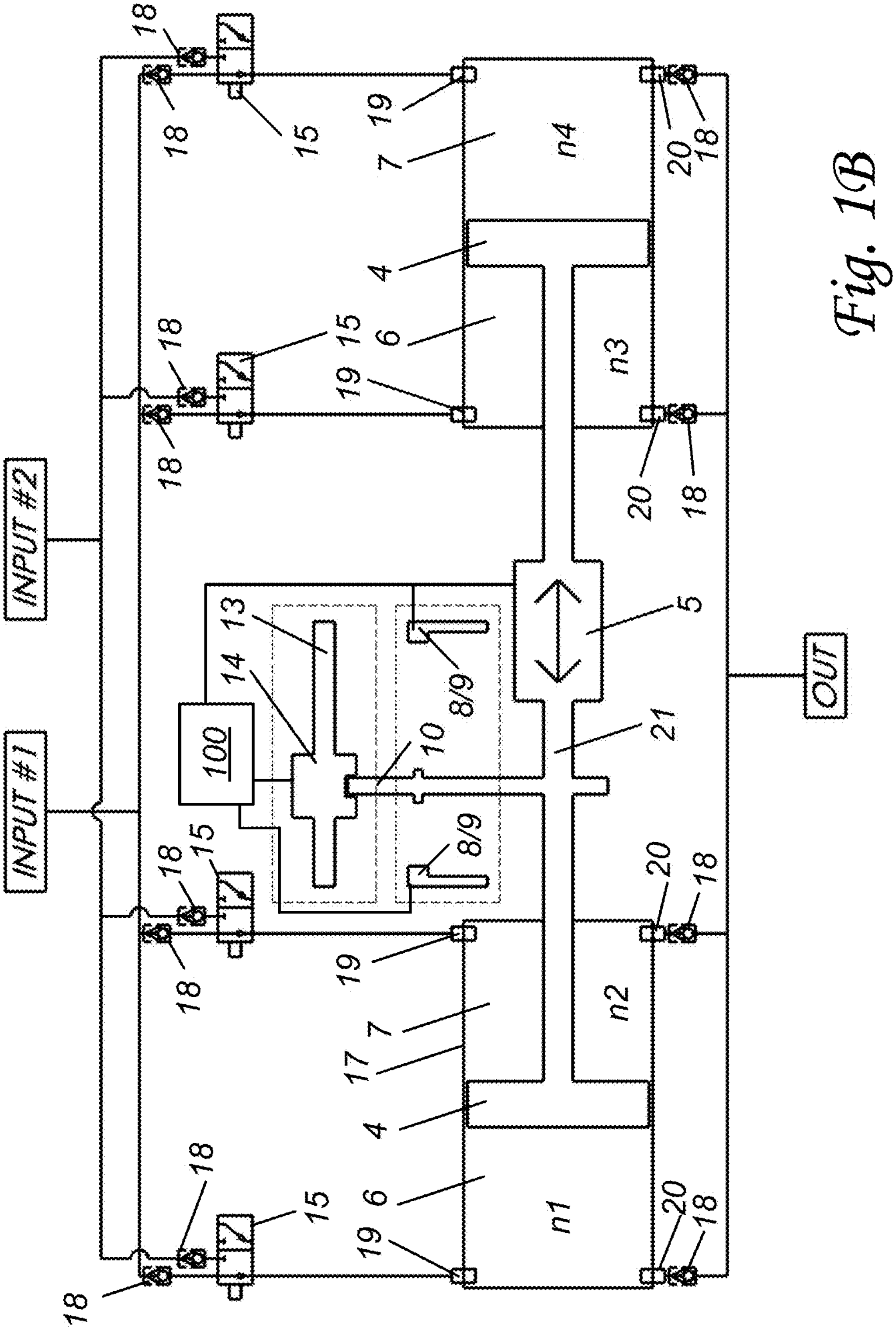
FIG. 1B illustrates one example of a multi-chamber fixed displacement piston proportioning pump where two input flows of two or more fluids are selectively diluted with one another before being merged at the output to achieve bypass without altering the flow rate of the pump.

Referring to FIG. 1B, there is illustrated one example of a four-chamber fixed displacement piston proportioning pump where two input flows of two or more fluids are selectively diluted with one another before being merged at the output to achieve bypass without altering the flow rate of the pump. In an exemplary embodiment, this is one example of a fixed flow, variable ratio, fixed displacement DRCS. In this regard, bypass valves 15 can be configured to supply fluid 30 to chambers 6 and 7 independently on two or more separate cylinders 17. Each of the fluid 30 inputs can be independently controlled by a control system 100 allowing the inflow into cylinders 6 and 7 on each cylinder 17 to be controlled by closing the respective bypass valve to stop fluid flow and opening the bypass valve to allow fluid to flow into a chamber through an ingress port 19 as the piston 4 moves in a manner that increases the volume of the chamber. In operation, Input #1 and Input #2 illustrated in FIG. 1B are the fluid 30 inputs. In this regard, Input #1 and Input #2 can be the same or different fluids, as may be required and/or desired in a particular embodiment. Note that if Input #1 were water, the pump's default setting would flush itself in a kind of self-cleaning action.

Figure 1C:
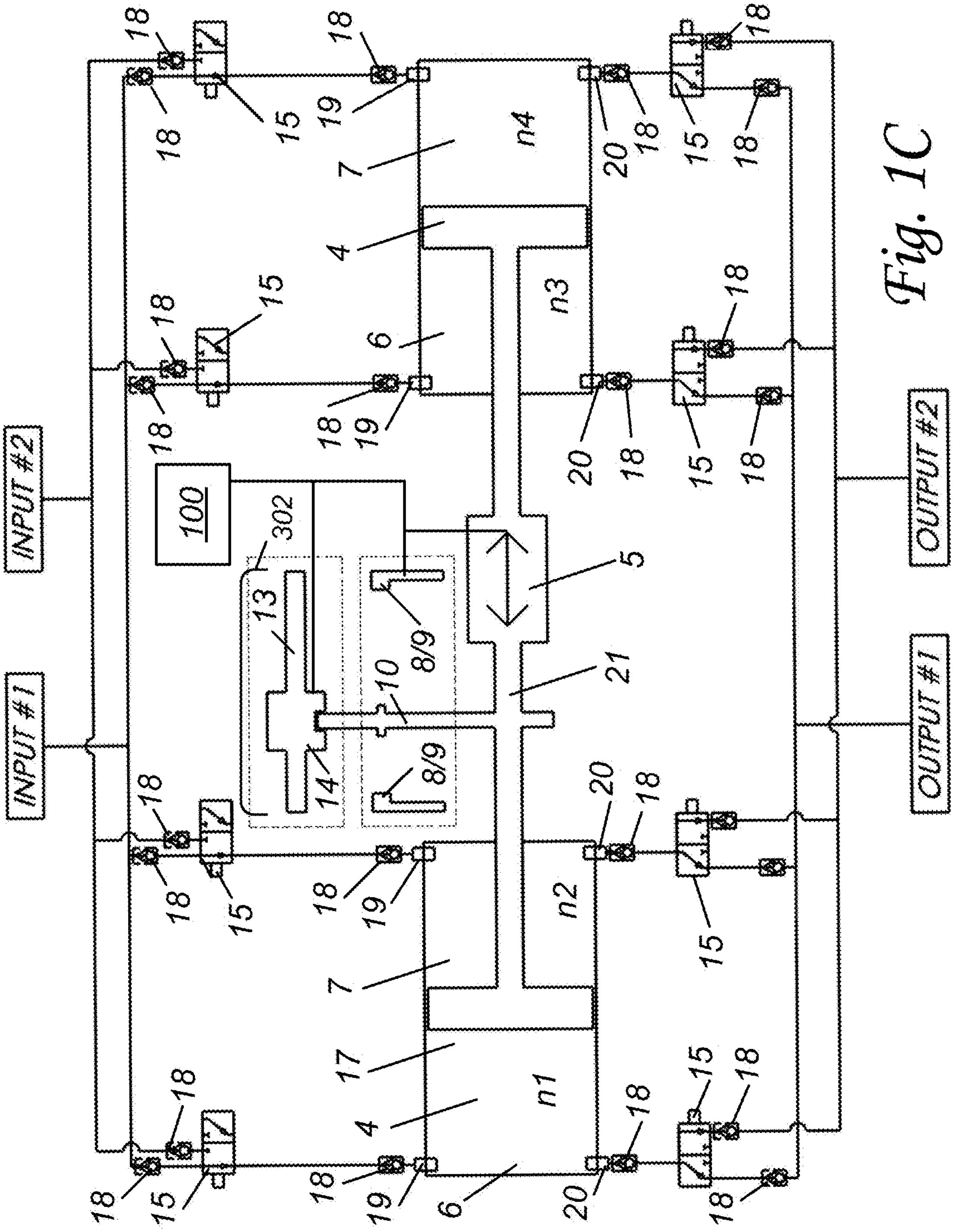
FIG. 1C illustrates one example of a multi-chamber fixed displacement piston proportioning pump where one fluid is selectively mixed with another fluid to achieve bypass and at least one resultant output flow of arbitrary mix ratio and arbitrary flow rate is created.

Referring to FIG. 1C, there is illustrated one example of a multi-chamber fixed displacement piston proportioning pump, where one fluid is selectively mixed with another fluid to achieve bypass, and at least one resultant output flow of an arbitrary mix ratio and an arbitrary flow rate is created. In an exemplary embodiment, this is one example of a variable flow, variable ratio, and fixed displacement DRCS. In this regard, bypass valves 15 can be configured to supply fluid 30 to chambers 6 and 7 independently on two or more separate cylinders 17. Each of the fluid 30 inputs can be independently controlled by a control system 100 allowing the inflow into cylinders 6 and 7 on each cylinder 17 to be controlled by closing the respective bypass valve to stop fluid flow and opening the bypass valve to allow fluid to flow into a chamber through an ingress port 19 as the piston 4 moves in a manner that increases the volume of the chamber. In operation, Input #1 and Input #2 illustrated in FIG. 1B are the fluid 30 inputs. In this regard, input #1 and input #2 can be the same or different fluids, as may be required and/or desired in a particular embodiment.

Additionally, bypass valves 15 can be configured on the output flows of each chamber 6/7 and controlled independently on two or more separate cylinders 17. In operation, with this configuration, each of the input flows and output flows to and from each of the chambers 6/7 in each of the cylinders 17 can be independently controlled, allowing infinite variable ratios and flows from the fixed ratio displacement piston proportioning pump 40.

Figure 1D:
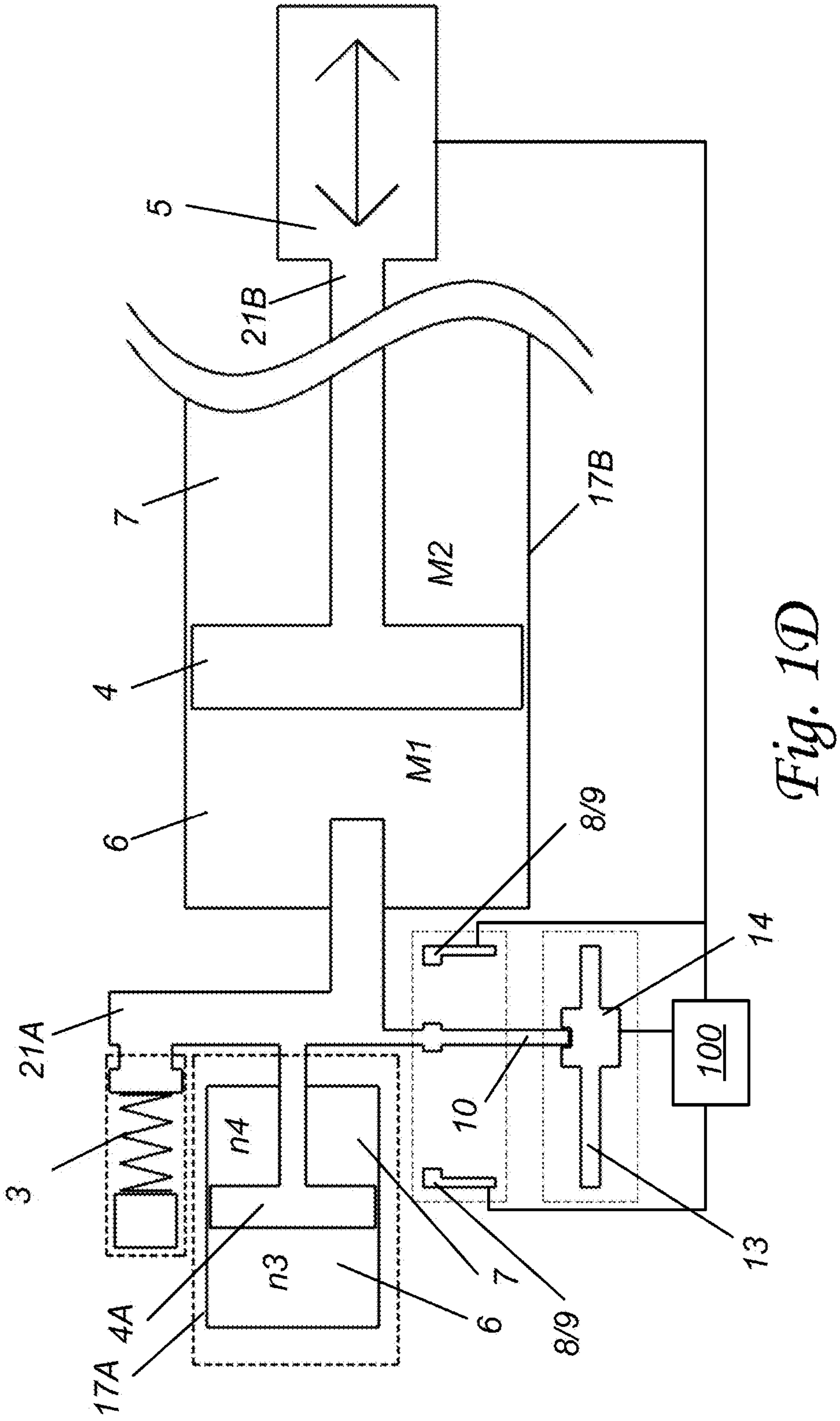
FIG. 1D illustrates one example of a mechanically decoupled dual-channel fixed ratio piston proportioning pump.

Referring to FIG. 1D, there is illustrated one example of a mechanically decoupled dual-channel fixed ratio piston proportioning pump 40. In an exemplary embodiment, this is one example of a dual chamber DRCS that achieves bypass by mechanically decoupling the linkage. In this regard, a cylinder 17A can be decoupled from a cylinder 17B, by way of a linkage 21A. In an exemplary embodiment, in operation, the motion of linkage 21B can cause linkage 21A to move. Displacement of linkage 21A can be measured at a shaft connection 10 by way of a control system 100.

In an exemplary embodiment, spring 3 can be used to provide a resistive force to piston 4A. Such a spring 3 can allow displacement motor 5 to exert force in a single-stroke direction, moving piston 4A to compress spring 3 and then relying on spring 3 to move piston 4A in the opposite stroke direction as the spring compressing force from displacement motor 5 abates.

Figure 1E:
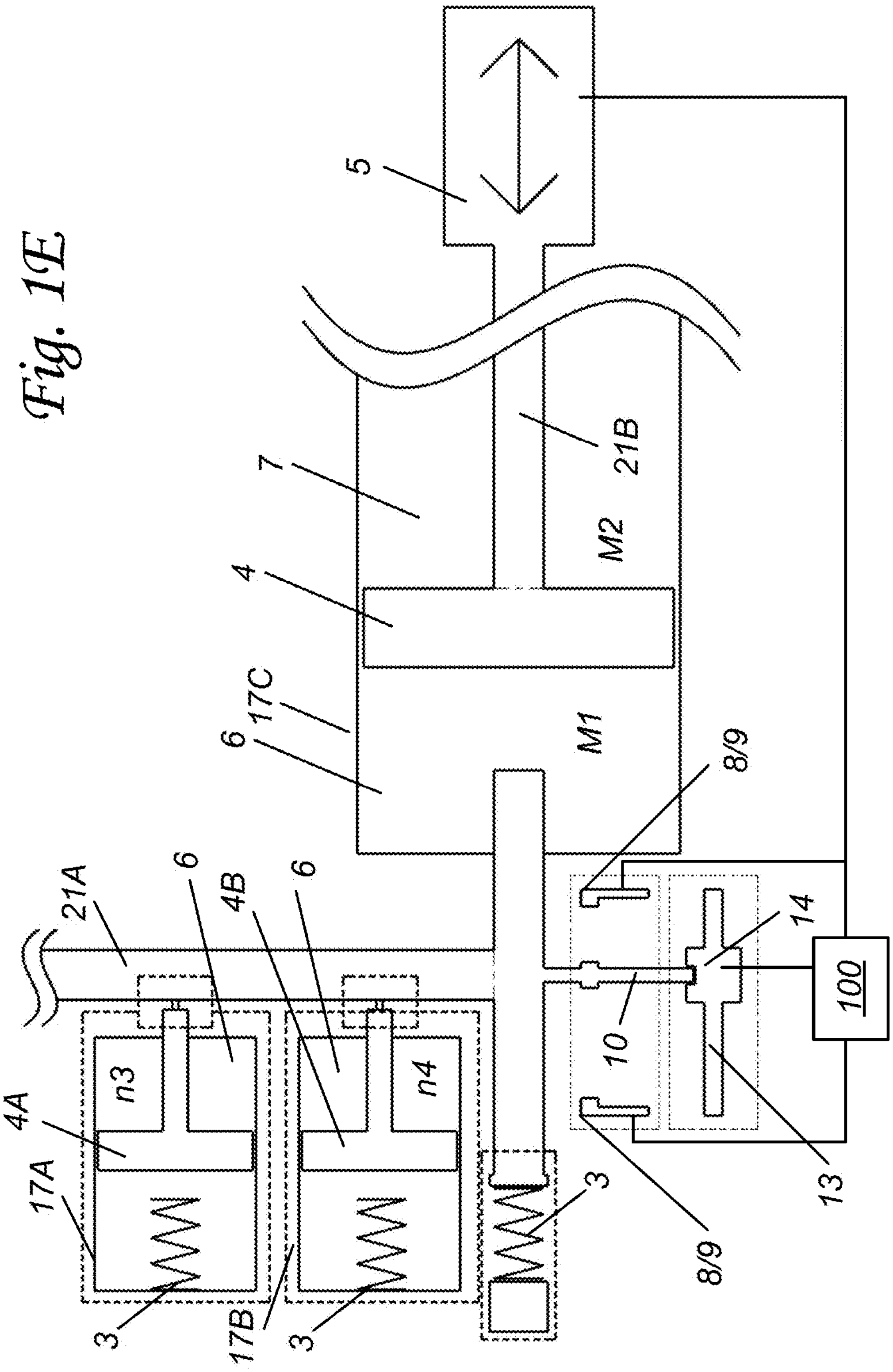
FIG. 1E illustrates one example of a mechanically decoupled multi-channel fixed ratio piston proportioning pump.

Referring to FIG. 1E, there is illustrated one example of a mechanically decoupled multi-channel fixed ratio piston proportioning pump 40. In an exemplary embodiment, this is one example of a multi-chamber DRCS that achieves bypass by mechanically decoupling the linkage. In this regard, cylinders 17A and 17B can be decoupled from cylinder 17C by way of linkage 21A.

In an exemplary embodiment, spring 3 can be used to provide a resistive force to piston 4A. Such a spring 3 can allow displacement motor 5 to exert force in a single-stroke direction, moving piston 4A/4B to compress spring 3 and then relying on spring 3 to move piston 4A/4B in the opposite stroke direction as the spring compressing force from displacement motor 5 abates. Such spring 3 can be located in the cylinder or outside the cylinder, as illustrated in FIG. 1E, as may be required and/or desired in a particular embodiment.

Figure 1F:
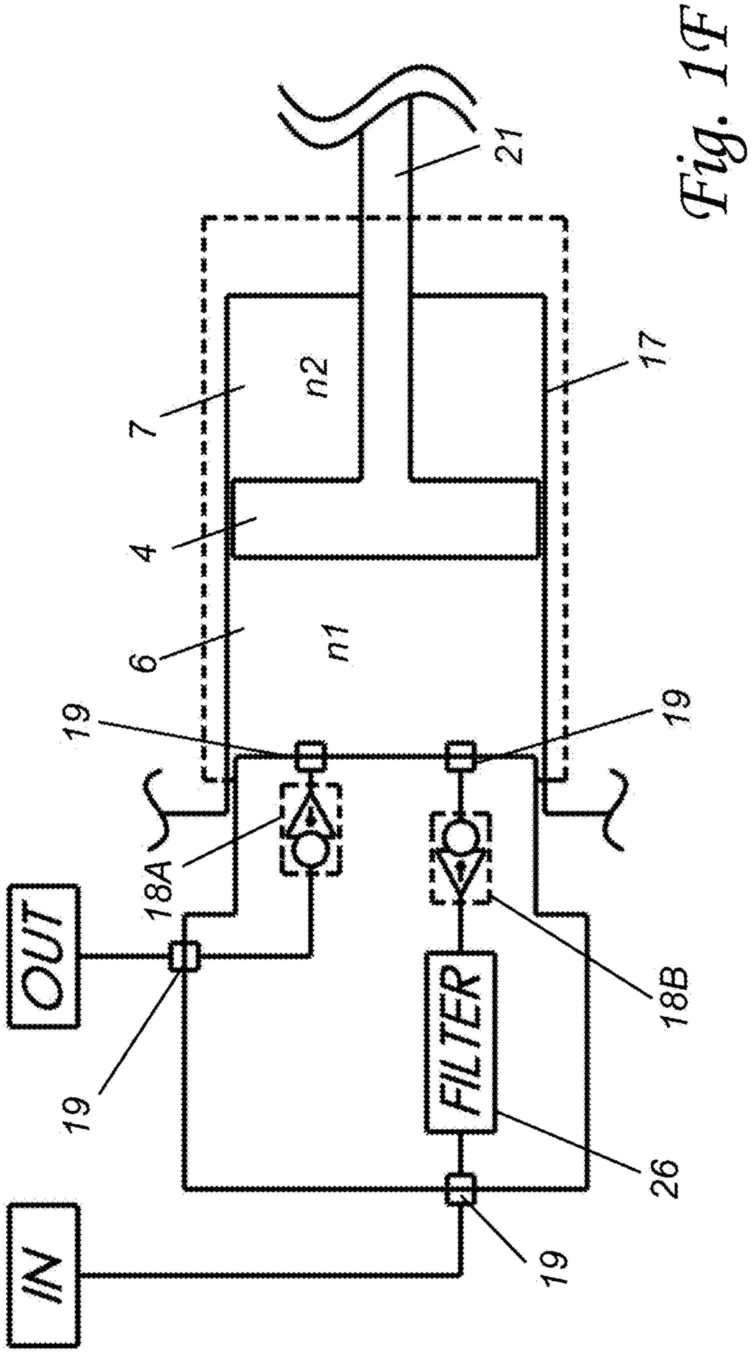
FIG. 1F illustrates one example of a modular check valve and filter configuration for a fixed ratio piston proportioning pump.

Referring to FIG. 1F, there is illustrated one example of modular check valves 15 and filter 26 configuration for a fixed ratio piston proportioning pump 40. In an exemplary embodiment, check valves 18 can be used in the present invention throughout the system tubing and pipes to limit fluid flow to a single desirable direction. In addition, filter 26 can be used to filter the fluids that pass through the systems of the present invention, such as to filter particulates, chemicals, or other types or kinds of filtering, as may be required and/or desired in a particular embodiment.

Figure 1G:
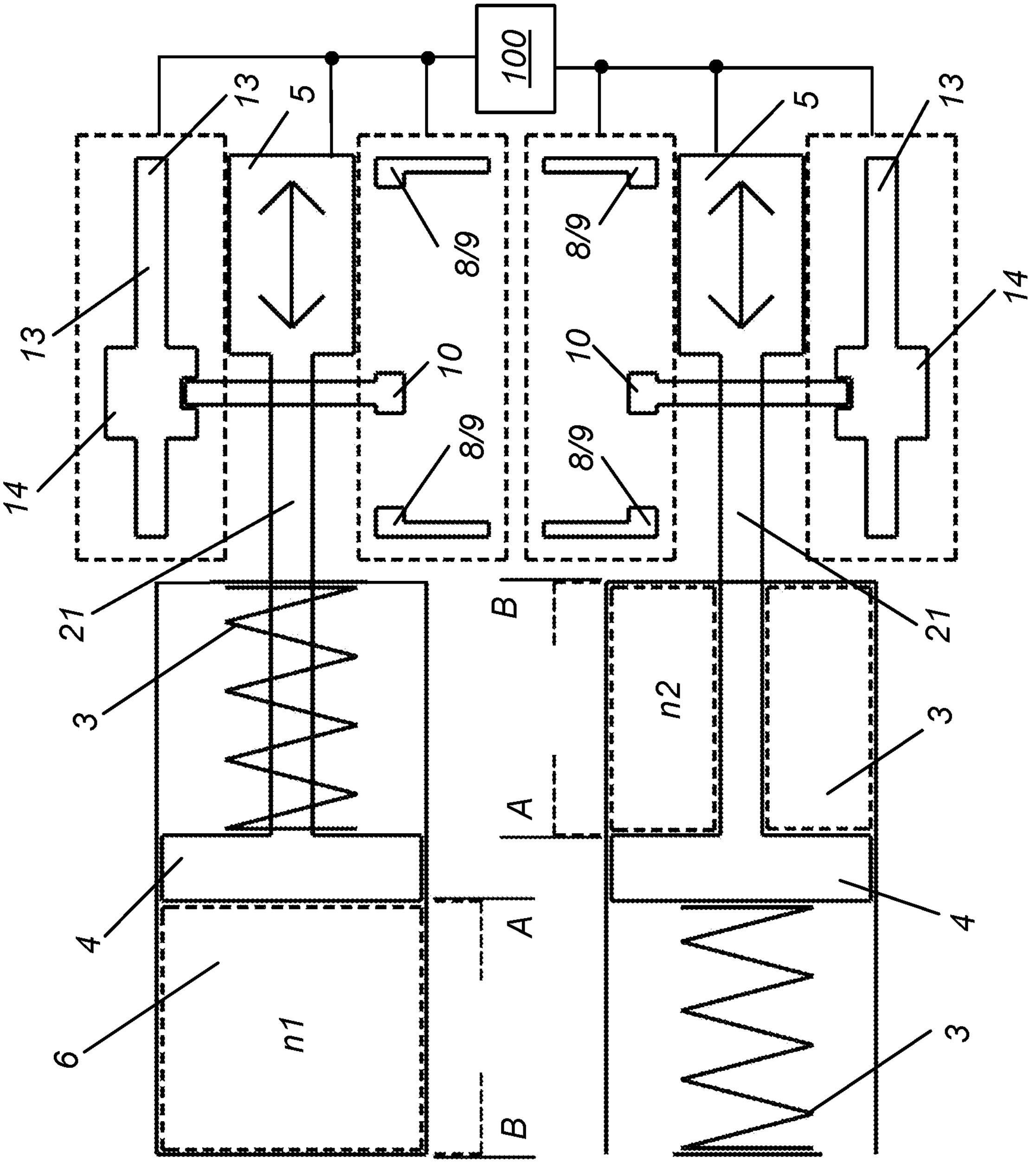
FIG. 1G illustrates one example of a parallel configuration of two fixed ratio piston proportioning pump.

Referring to FIG. 1G, there is illustrated one example of a parallel configuration of two piston proportioning pump 40. In an exemplary embodiment, two fixed-ratio piston proportioning pumps can be operated in parallel by a single control system 100.

Figure 2A:
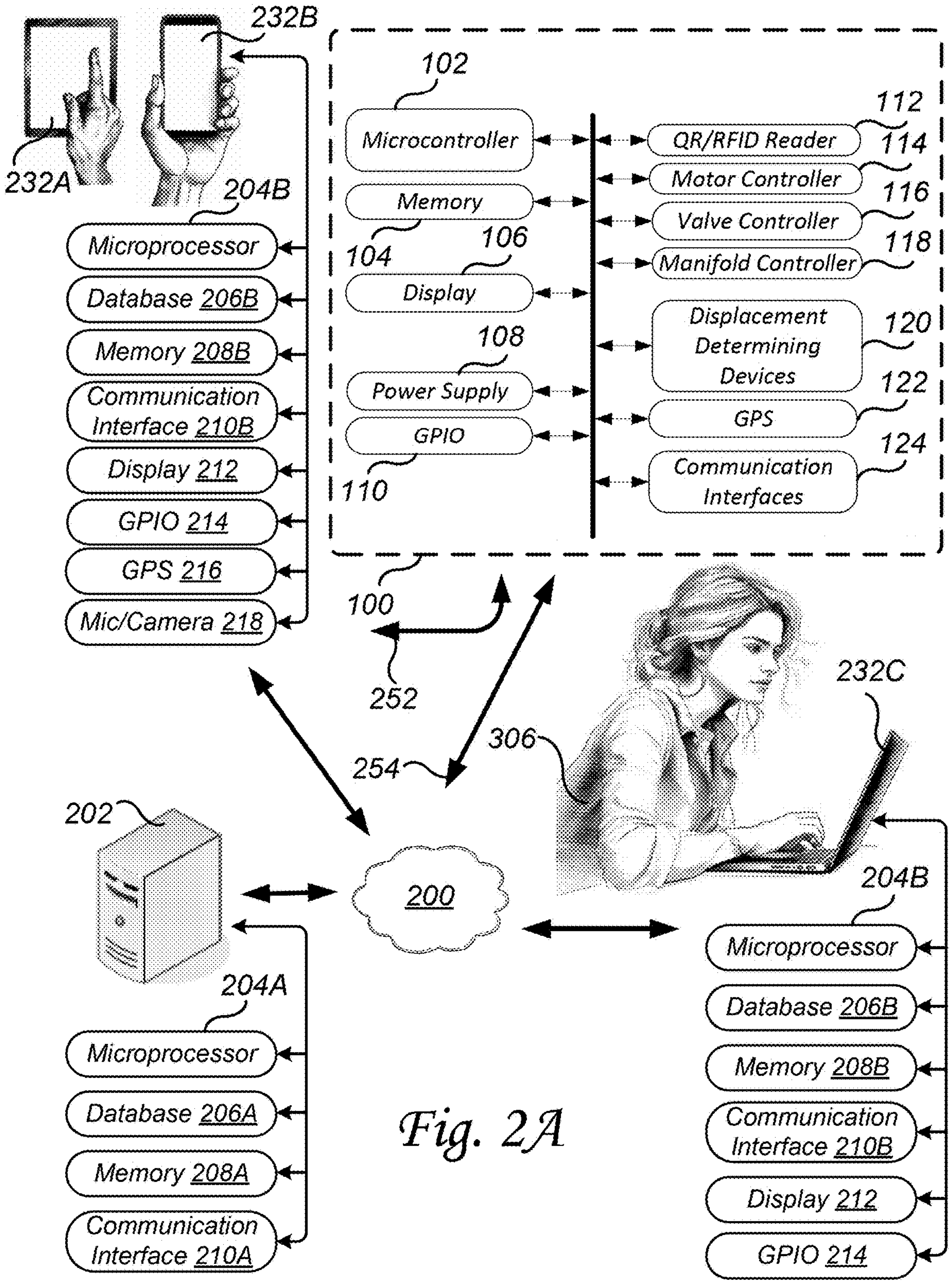
FIG. 2A illustrates one example of a system and network for a DRCS-enabled fixed ratio piston proportioning pump.

Referring to FIG. 2A, there is illustrated one example of a system and network for a DRCS-enabled fixed ratio piston proportioning pump 40. In an exemplary embodiment, the DRCS-enabled fixed ratio piston proportioning pump 40 can be web-enabled.

The term "web-enabled" or "web-enabled control system" or "web-enabled control system 100" in the present invention is intended to mean an Internet-of-things device. In this regard, a device that is capable of connecting a physical device, such as a DRCS-enabled fixed ratio piston proportioning pump 40, to the digital world. Stated differently, web-enabling is equipping a device with the necessary electronics to be monitored, controlled, and data communicated locally and remotely with other data-communicating devices 232. Such other data-communicating devices 232, also referred to as computing devices 232, can be smartphones, tablets, laptops, other web-enabled devices, servers, and similar devices.

The computing devices 232 can comprise a microprocessor 204B, a database 206B, memory 208B, a communication interface 210B, a display 212, and a plurality of general-purpose inputs and outputs (GPIO) 214. Additionally, the mobile type of computing device 232 (tablets, smartphones, and others) can comprise a global positioning system (GPS) 216, and a microphone and/or camera 218. In general, computing devices 232, can be configured with other functions and features, as may be required and/or desired in a particular embodiment.

The microprocessor 204B can be operationally related to database 206B, memory 208B, communication interface 210B, display 212, GPIO 214, and if equipped with GPS 216, a microphone and/or camera 218. The computing devices 232 each rely on a suitable power source, which can include a rechargeable battery, external power supply, or other types and/or kinds of power sources.

Microcontroller 204B can be INTEL, ZILOG, MICROCHIP, AMD, ARM, and/or other types or kinds of microprocessors.

Database 206B can be SQL, MYSQL, MARIADB, ORACLE, MS ACCESS, network-accessible storage, flat files, a combination thereof, or other types and kinds of databases.

Memory 208B can be a combination of random access memory (RAM), read-only memory (ROM), flash, hard drives, solid-state drives, USB flash drives, micro-SD cards, or other types of removable memory, and/or other types and kinds of memory.

The communication interfaces 210B can be local area network (LAN), wide area network (WAN), universal serial bus (USB), Ethernet, recommended standard 232 (RS232), recommended standard 485 (RS485), serial, Wi-Fi, 802.11abgn and similar, second generation (2G), third-generation (3G), fourth-generation (4G), fifth generation (5G) compatible, Bluetooth, transmission control protocol (TCP), user datagram protocol (UDP), Mesh Network, Zigbee, Pico Network, long range navigation (LORAN), and/or other types and kinds of communication interfaces and protocols.

Display 212 can be a liquid crystal display (LCD), light emitting diode (LED), organic light emitting diode (OLED), or other types and kinds of displays.

The general-purpose inputs and outputs (GPIO) 214 can be transistor-to-transistor logic (TTL), complementary metal oxide semiconductor (CMOS), metal-oxide-semiconductor field effect transistor (MOSFET), transistors, buffers, relays, pushbuttons, switches, and/or other types and kinds of GPIO circuits. In an exemplary embodiment, some of the GPIO 214 lines can be used to drive a touch screen input, biometric input devices, keyboards, and or types and kinds of computing device input devices.

Global positioning system (GPS) device 216 can be used to determine the geographic location of users 306 who are carrying a computing device 232 equipped with a GPS 216. In this regard, such computing devices 232 are typically mobile computing devices such as tablets 232A, smartphones 232B, and other similar types and/or kinds of mobile computing devices 232.

Microphone and/or camera 218 can be used to record audio, video, and take pictures. In this regard, users 302/304/306 can use their computing devices equipped with a microphone and/or camera 218 to make digital media records.

The data processing resource 202 can be a server, network storage device, or other types and kinds of data processing resources. Such data processing resources can be AMAZON WEB SERVICES (AWS), MICROSOFT AZURE, or other types and kinds of hosted data processing resource services. For disclosure purposes, a remote data processing resource 202 can also be referred to as server 202.

The data processing resource 202 can comprise a microprocessor 204A, a database 206A, memory 208A, and a communication interface 210A. The microprocessor 204A is operationally related to database 206A, memory 208A, and communication interface 210A.

The microcontroller 204A can be INTEL, ZILOG, MICROCHIP, AMD, ARM, and/or other types or kinds of microprocessors.

The database 206A can be SQL, MYSQL, MARIADB, ORACLE, MS ACCESS, network accessible storage, flat files, a combination thereof, or other types and kinds of databases.

The memory 208A can be a combination of RAM, ROM, flash, hard drives, solid-state drives, USB flash drives, micro-SD cards, or other types of removable memory, and/or other types and kinds of memory.

The communication interfaces 210A can be LAN, WAN, USB, Ethernet, RS232, RS485, serial, Wi-Fi, 802.11abgn, and similar, 2G, 3G, 4G, 5G compatible, Bluetooth, TCP, UDP, Mesh Network, Zigbee, Pico Network, LORAN, and/or other types and kinds of communication interfaces and protocols.

In operation, computing devices 232, DRCS-enabled fixed ratio piston proportioning pump 40, and other data communicating devices can data communicate with remote data processing resources 202 and utilize data storage resources such as database 206A. Such remote data processing resources 202 can be a server or other types and kinds of data processing resources. Furthermore, computing devices 232, remote data processing resources 202, data storage resources 206A, DRCS-enabled fixed ratio piston proportioning pump 40, and other types and kinds of data communicating devices can data communicate over a global network 200. The global network 200 can be the Internet.

In an exemplary embodiment, operational parameters associated with the DRCS-enabled fixed ratio piston proportioning pump 40 and other data can be data communicated and stored on a remote data processing resource 202 and/or associated database 206A.

In an exemplary embodiment, DRCS-enabled fixed ratio piston proportioning pump 40 can be equipped with a web-enabled control system 100. Such a web-enabled control system can comprise a microcontroller 102 which is operationally related to memory 104, display 106, power supply 108, general-purpose inputs and outputs (GPIO) interface 110, QR/RFID reader 112, motor control 114, valve controls 116, manifold controls 118, displacement determining devices 120, global position system (GPS) 122, and a plurality of communication interfaces 118.

The microcontroller 122 can be an INTEL, ZILOG, MICROCHIP, AMD, ARM, and/or other types or kinds of microcontrollers.

The memory 104 can be a combination of RAM, ROM, flash, hard drives, solid-state drives, USB flash drives, SD cards, micro-SD cards, thumb drives, permanent, removable, or a combination thereof, and/or other types and kinds of memory.

The display 106 can be a liquid crystal display (LCD), organic light emitting diode display (OLED), light emitting diode (LED), a combination thereof, and/or other types and kinds of displays.

The power supply/power switch 108 can be a disposable battery, rechargeable battery, and/or other types and kinds of power supplies. In an exemplary embodiment, a power switch can be implemented with the power supply so that user 306 can manually turn 'ON'/'OFF' the DRCS-enabled fixed ratio piston proportioning pump 40.

The general purpose inputs and outputs (GPIO) 110 can be TTL, CMOS, transistors, buffers, relays, pushbuttons, switches, and/or other types and kinds of GPIO circuits.

The machine code reader 112, also referred to as the QR code/RFID reader 112, can be a system-level module that integrates into the control system 100 and is operationally related to the microcontroller 102. In operation, the QR code/RFID reader 112 can read machine codes that enable or grant access to operate, direct the operation, volume dispense and/or concentrations of fluids 30, or influence other operational parameters of the fixed ratio piston proportioning pump 40, as may be required and/or desired in a particular embodiment.

The motor controller 114 can be relays, MOSFETs, voltage frequency drives (VFD), stepper motor drives, or other suitable controllers without particular limitations that are capable of operating, regulating speed, and/or influencing other operational parameters of one or more motors 5. The type and/or kinds of motors 5 are not particularly limited and can include DC, linear, stepper, servo, VFD controller, or other types and/or kinds of motors, as may be required and/or desired in a particular embodiment.

The valve controller 116 can be a relay, MOSFET, or other types and kinds of controlling devices. In operation, the valve controller 116 interconnects with and is operationally related to one or more electronic actuators, such as bypass valve 15 and/or manifold 16 valves. Such electronic actuators can be solenoids or other types and kinds of actuators, as may be required and/or desired in a particular embodiment.

The manifold controller 118 can be configured to receive one or more fluid flows and mix or route the various fluid flows to different outlet ports or locations, and/or mix the various fluid flows in different combinations by way of using one or more electronic actuated valves or other suitable controllable valves. Such electronic actuators can be solenoids or other types and kinds of actuators, as may be required and/or desired in a particular embodiment.

The displacement-determining device 120 limits piston 4 range of motion and/or measures the displacement of piston 4. Such displacement-determining devices 120 can include limit switches, encoders, hall effect sensors, capacitive sensors, optical sensors, proximity sensors, radar sensors, or other types and or kinds of suitable sensors, as may be required and/or desired in a particular embodiment.

The global positioning system (GPS) device 122 can be used to determine the geographic location of the fixed ratio piston proportioning pump 40. In this regard, such a fixed ratio piston proportioning pump 40 can be mobile on vehicles where the GPS location of the fixed ratio piston proportioning pump 40 can be used to determine when fluid 30 is to dispense, such as in geofenced applications, as may be required and/or desired in a particular embodiment.

The communication interfaces 124 can be LAN, WAN, USB, Ethernet, RS232, RS485, serial, WiFi, 802.11abgn, and similar, 2G, 3G, 4G, 5G compatible, Bluetooth, TCP, UDP, Mesh Network, Zigbee, Pico Network, LORAN, and/or other types and kinds of communication interfaces and protocols.

A user interface can be formed by one or more of the following: a display 1106, a GPIO 110, and other suitable devices as may be required and/or desired in a particular embodiment.

Figure 2B:
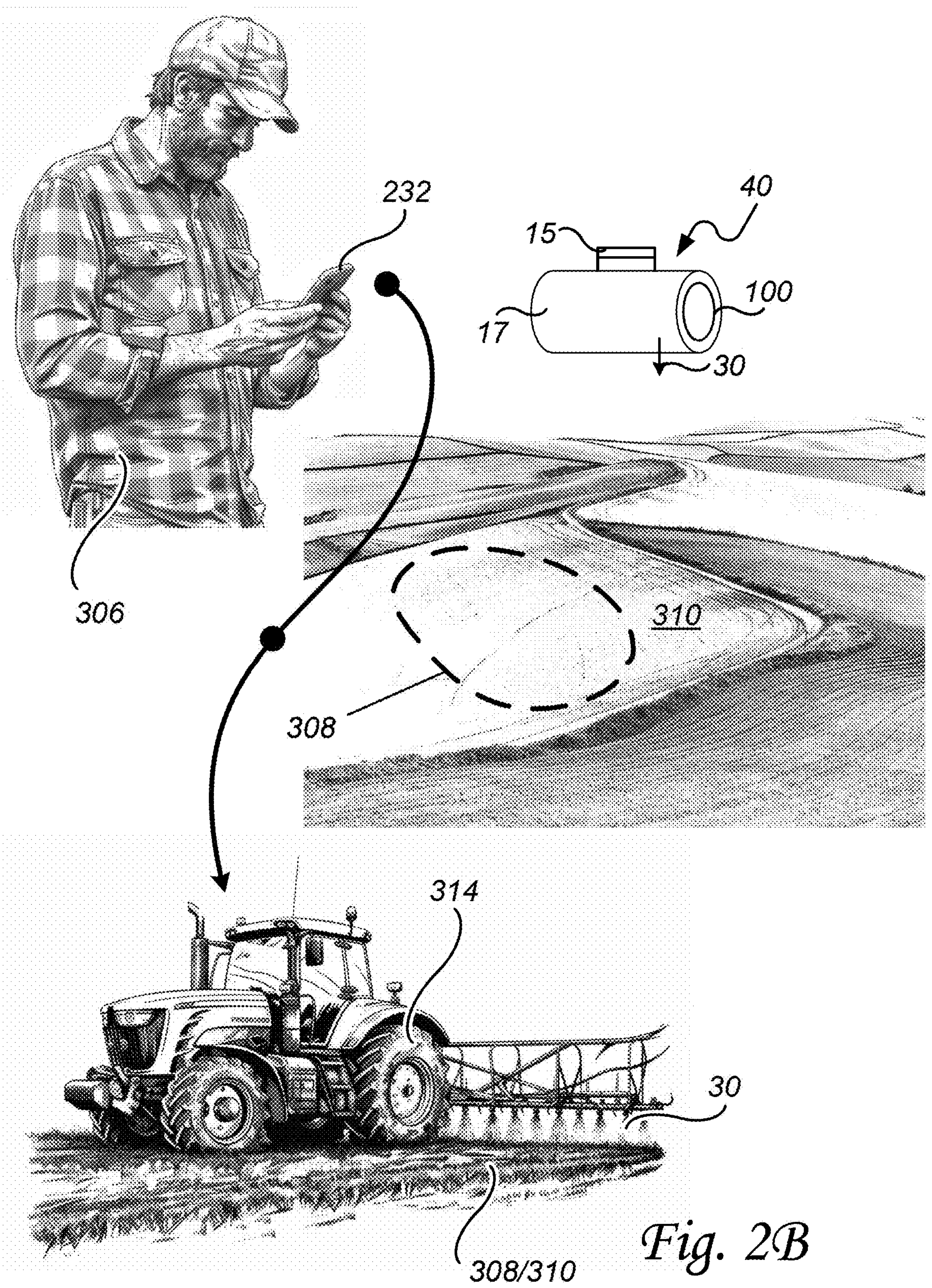
FIG. 2B illustrates one example of a DRCS-enabled fixed ratio piston proportioning pump being used in an agricultural embodiment.

Referring to FIG. 2B, there is illustrated one example of a DRCS-enabled fixed ratio piston proportioning pump 40, being used in an agricultural application. In an exemplary embodiment, user 306 can use computing device 232 to configure operational parameters of the DRCS-enabled fixed ratio piston proportioning pump 40 as well as establish geofenced areas 308 within an agricultural area 310. Such operational parameters can be the type or kind of fluid 30 to dispense, the concentration of fluid 30 to dispense, geofenced locations 308 to either dispense or not to dispense fluid, or other types and/or kinds of operational parameters as may be required and/or desired in a particular embodiment.

In operation, the DRCS-enabled fixed ratio piston proportioning pump 40 is in motion with vehicle 314, such as a tractor. While motor 5 can be continuously operated, the bypass valve 15 can be opened, preventing the fluid from being dispensed. When vehicle 314 enters a geofenced area, bypass valve 15 can be closed, causing the fluid to be dispensed. Such fluid can be fertilizer, insecticide, or other suitable solution.

In the alternative, the system can be configured such that the geofenced area 308 is a don't dispense area, and as such, when the vehicle is outside the geofenced area 308, the fluid can be dispensed.

The computing device 232 can be equipped with a GPS 216 which is also in motion with user 306 operating vehicle 314, GPS 122 operationally related to the control system 100 and in motion with vehicle 314 can be used to determine the GPS location of the vehicle 314, or other suitable GPS systems such as with the vehicle 314 and others can be used and the relevant data and operational parameters data communicated to the control system 100.

Figure 3:
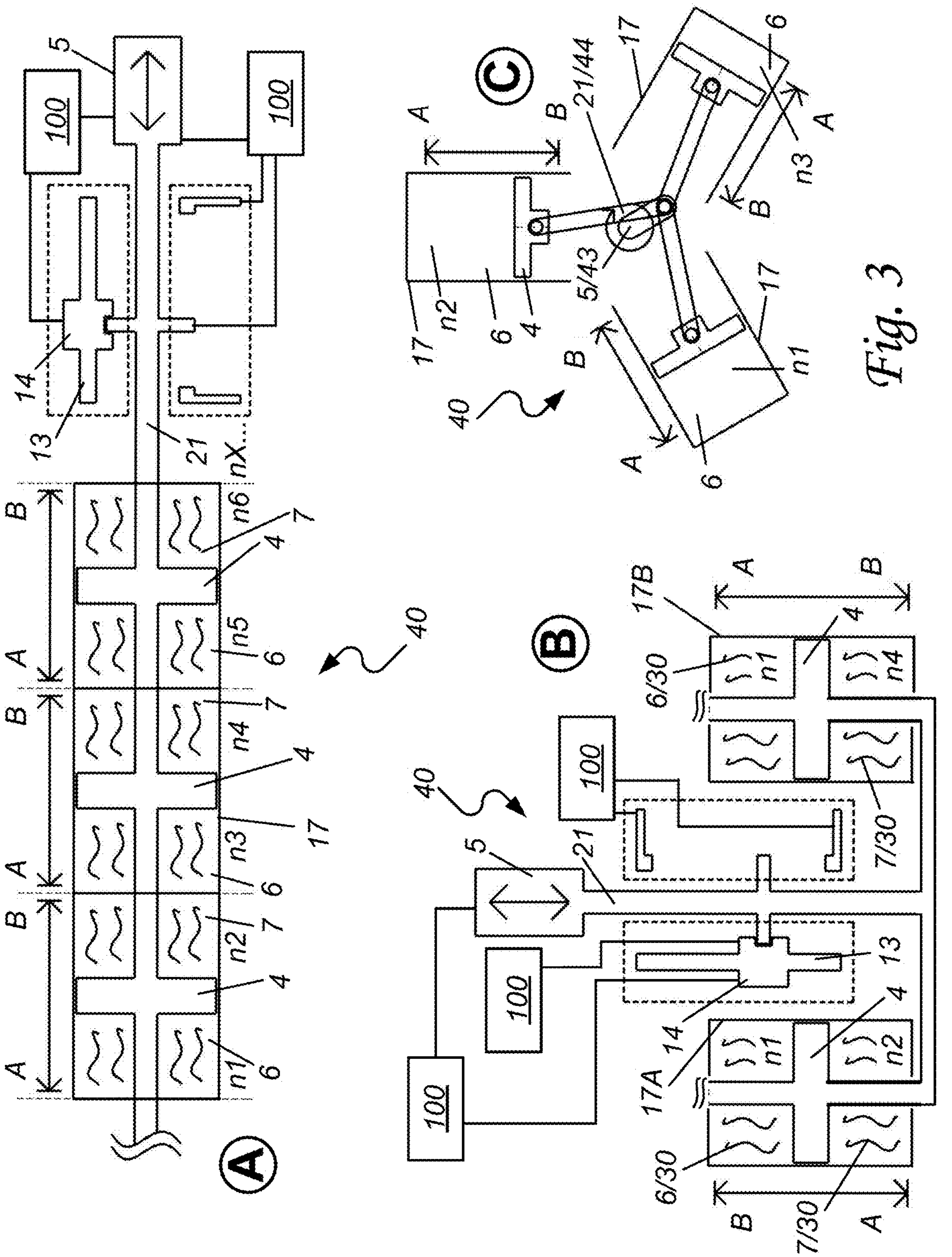
FIG. 3 illustrates examples of fixed ratio piston proportioning pumps having an array of pistons and chambers.

Referring to FIG. 3, there are illustrated examples of DRCS-enabled fixed ratio piston proportioning pumps 40 having an array of chambers 6/7 and of pistons 4 that for chamber volumes n1, n2, n3, nx . . . . In an exemplary embodiment, in reference 'A', an array n1, n2, n3, nx . . . of mixing chambers 6/7 can each be configured as a DRCS-enabled piston proportioning pump. In this regard, the pump is coupled to the piston linkage 21 such that encoding some part of the linkage indicates the swept volume of the entire configuration. Mechanically or hydraulically, chambers 6/7 can be coupled in series, parallel, etc., and can be out of phase and/or amplitude.

In reference 'B', parallel cylinders 17A and 17B can be configured. Such cylinders 17A and 17B can be the same size or different sizes, creating the ability to change the volume or fluid dispensed from the chamber 6/7 during one piston cycle, called the swept volume. In this regard, while the swept distance of the pistons 4 is the same for each cycle in each cylinder, varying the cylinder sizes allows the swept volumes to be configured differently, offering a variation of ratiometric mixing from the same physical pump system.

In reference 'C', a central motor 5 with a rotary encoder 43 can operate a linkage comprising a crankshaft 44 to drive pistons 4 out of phase of one another in more than one cylinder 17.

Figure 4A:
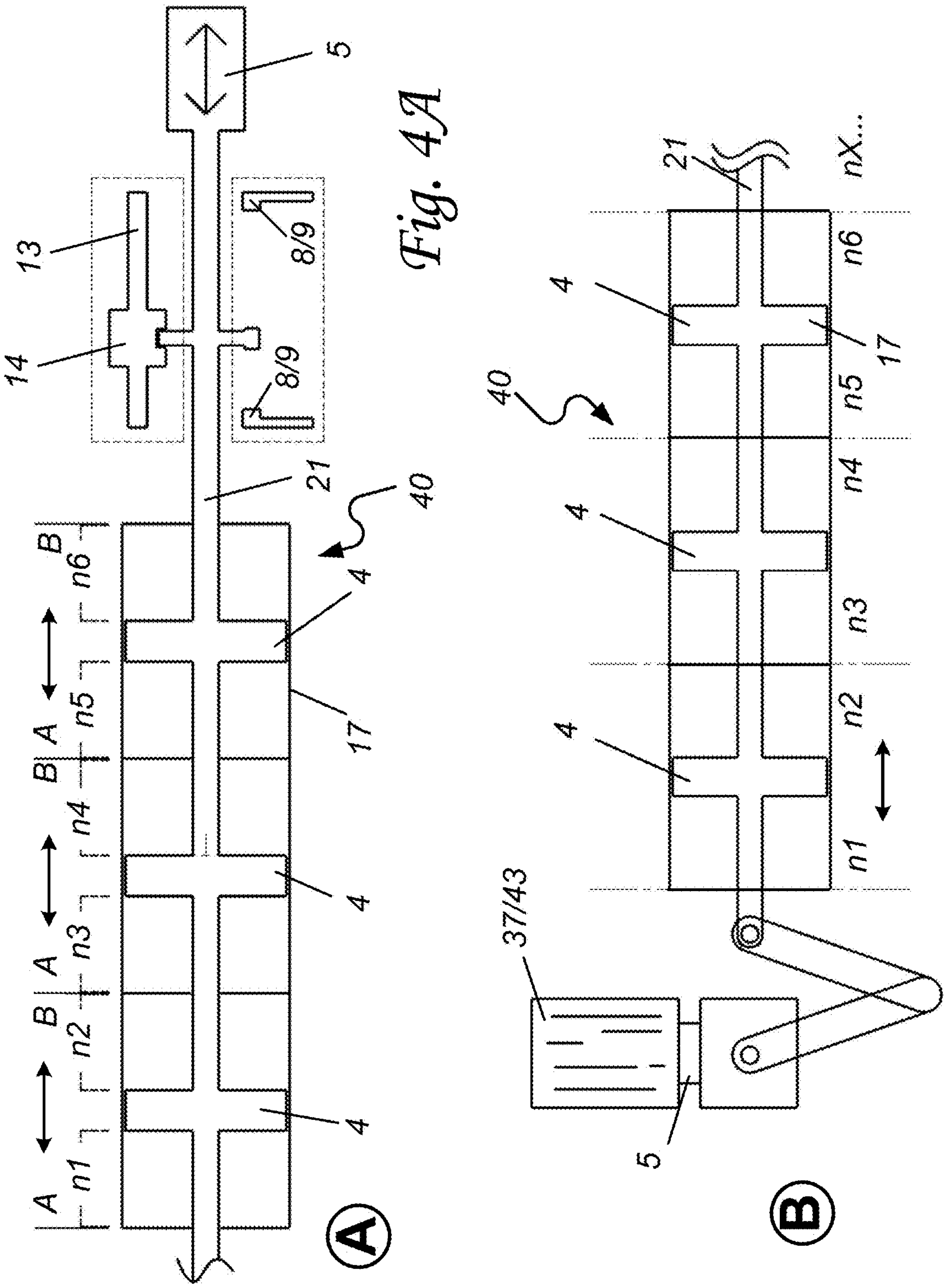
FIG. 4A illustrates examples of fixed ratio piston proportioning pumps with different sources of linear motion.

Referring to FIG. 4A, there are illustrated examples of DRCS-enabled fixed ratio piston proportioning pumps 40 with different sources of linear motion. In a plurality of exemplary embodiments, a coupled array of pumps can be attached to and driven by a hydraulic ram or other suitable linear actuator that has some other purpose, in a machine that cannot be stopped.

A "servo" motor comprises an electric motor 5 with an integrated rotary encoder 43 and functions as a motive force 5. Such a motor is easily shut off, but to achieve a certain proportion of fluids, one of the fluids may need to be pumped constantly or for some other duration.

Figure 4B:
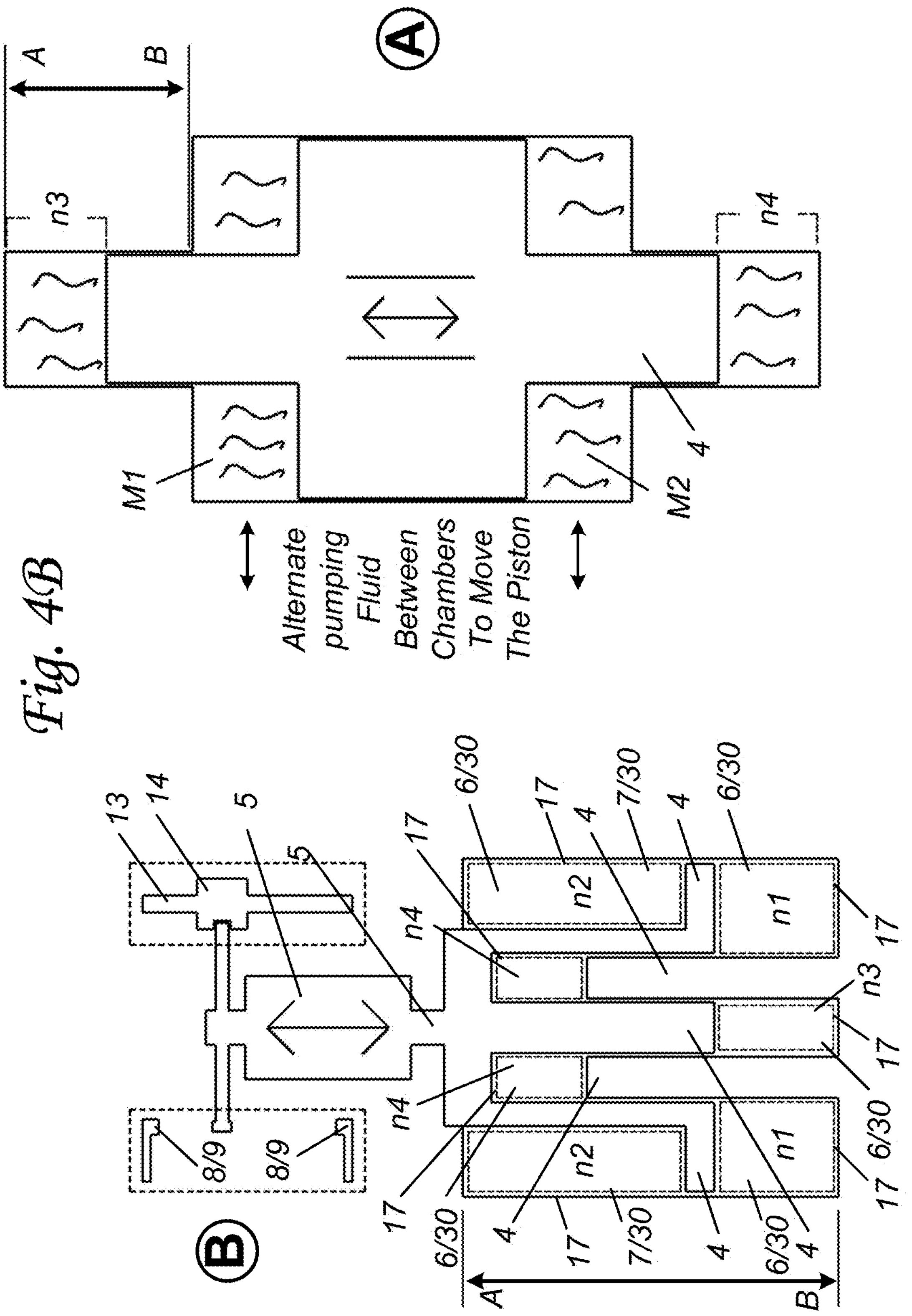
FIG. 4B illustrates examples of fixed ratio piston proportioning pumps with different sources of linear motion and piston configurations.

Referring to FIG. 4B, there are illustrated examples of DRCS-enabled fixed ratio piston proportioning pumps 40 with different sources of linear motion and piston configuration. In an exemplary embodiment, in reference 'A', the pump or pump array can be driven by a water motor with the water itself being a solvent for all the other fluids being pumped (the water itself a fluid of the mix). In this regard, a fluid can be pumped between chambers M1 and M2 to move the piston 4 back and forth.

In an exemplary embodiment, in reference 'B', linkage 21 can be formed with at least one piston attached to more than one branch forming multiple pistons 4 in parallel, each configured for use in a mutually exclusive cylinder 17, and each of the pistons 4 is interconnected to and operated by a single linkage 21.

Figure 4D:
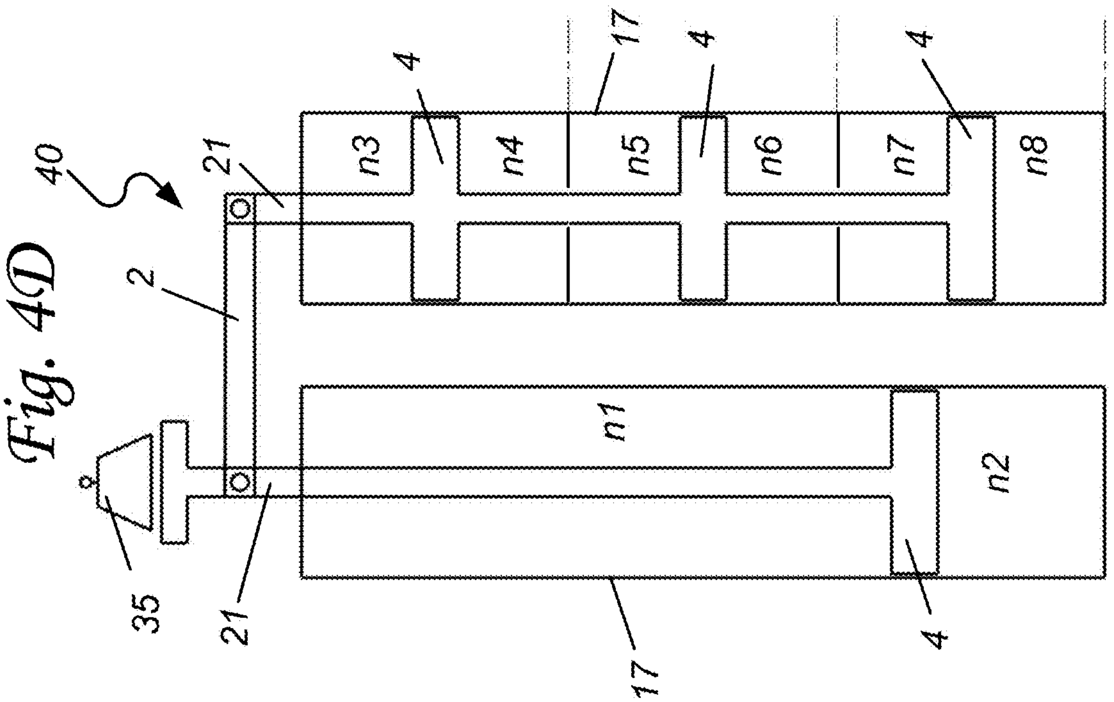
FIG. 4D-4E illustrates one example of a gravity assist fixed ratio piston proportioning pump.
Figure 4C:
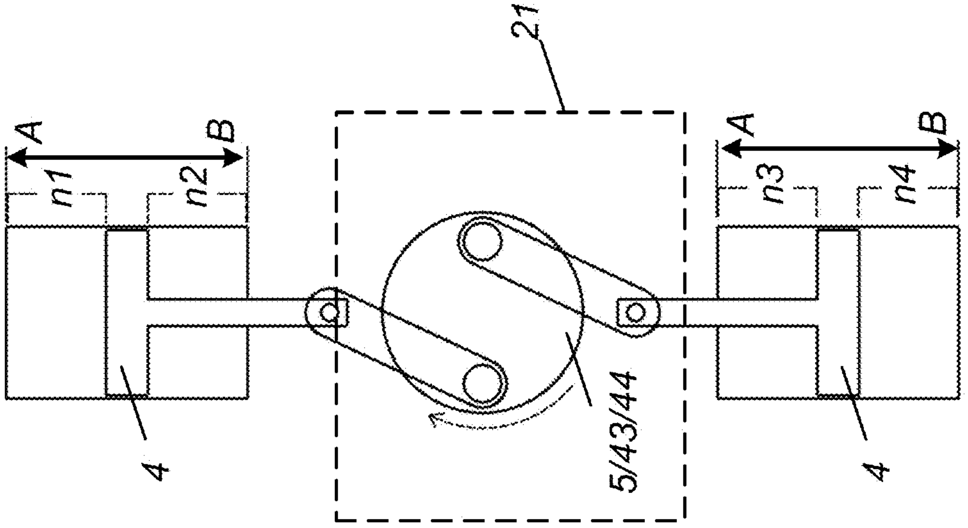
FIG. 4C illustrates one example of a motor coupled to linkages operating a two-cylinder pump.

Referring to FIG. 4C, there is illustrated a linkage 21 comprising a crankshaft 44 and a rotary encoder 43 operating a two-cylinder pump.

Referring to FIG. 4D, there is illustrated one example of a gravity assist fixed ratio piston proportioning pump 40. In operation, a weight 35 can be used to provide a gravity force to move the linkage 21 and pistons 4. Cylinders 17 can be the same size or different sizes to control the sweep volume discharge and the ratiometric mixture of the outflow of fluids 30.

Figure 4E:
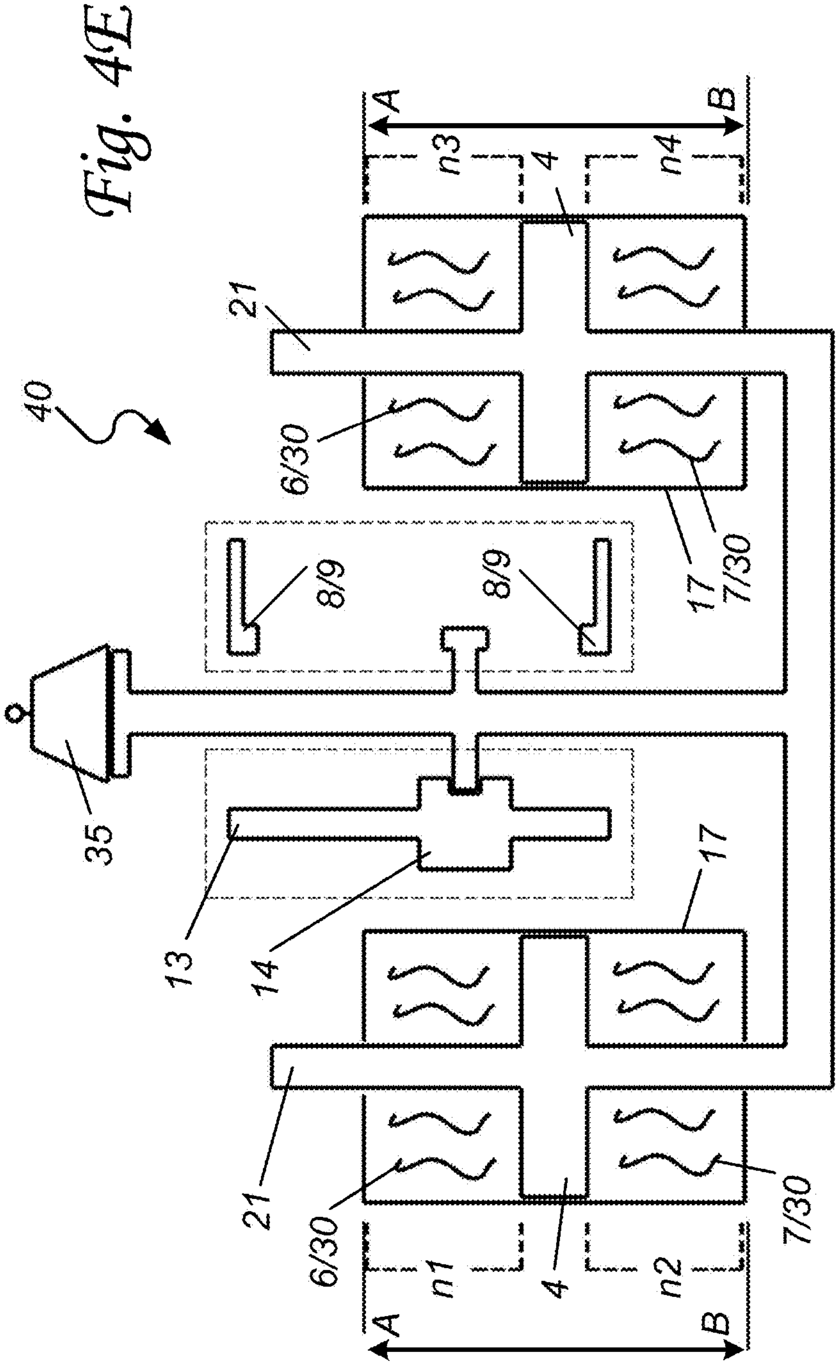

Referencing FIG. 4E, there is illustrated one example of a gravity assist DRCS-enabled fixed ratio piston proportioning pump 40 with a parallel cylinder configuration of cylinders 17.

Figure 4F:
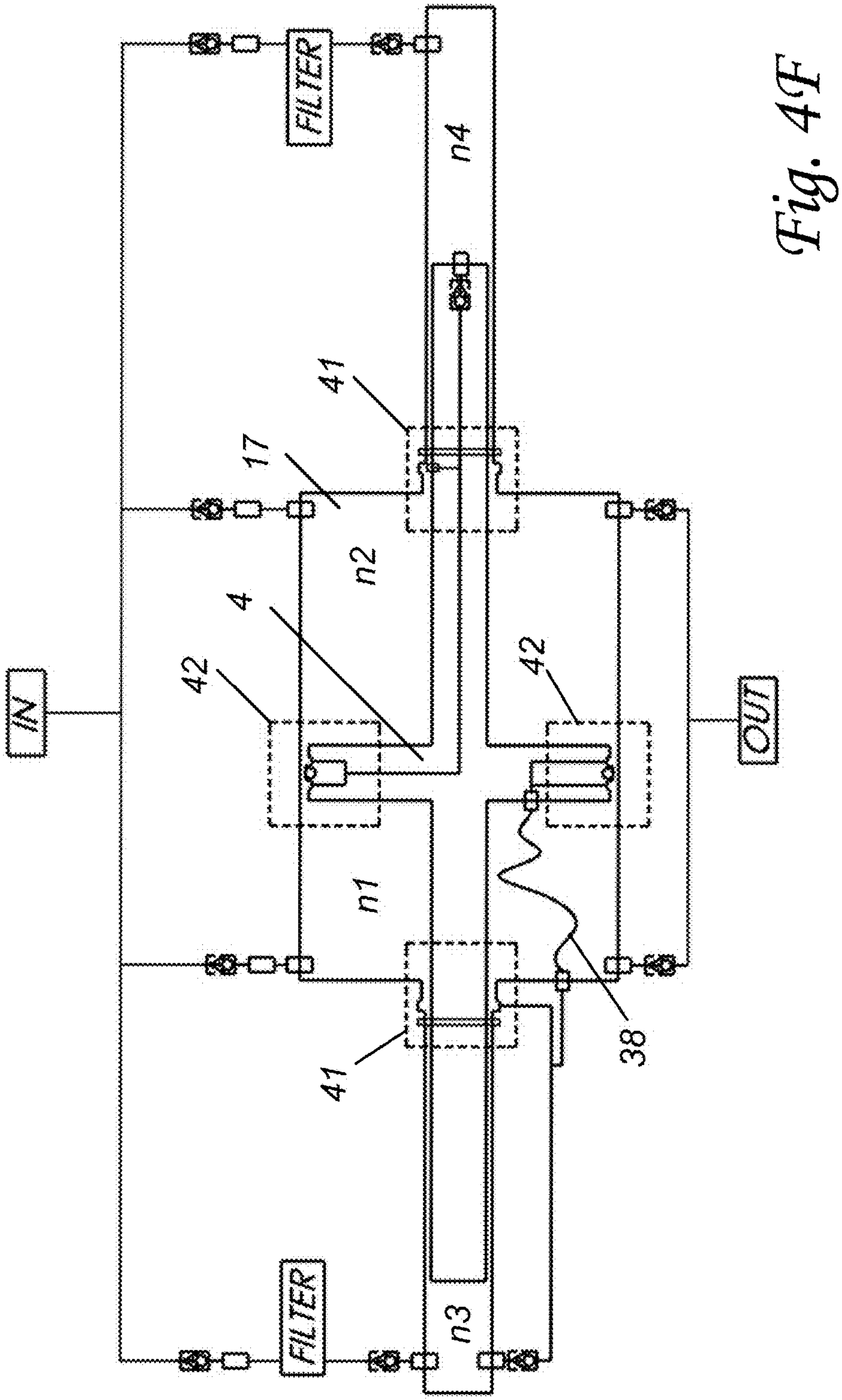
FIG. 4F illustrates one example of a multi-chamber proportioning pump configured for high-pressure discharge.

Referring to FIG. 4F, there is illustrated one example of a four-chamber proportioning pump with chambers n3 and n4 configured for high-pressure discharge and subsequently routed to the location of the dynamic rod seal 41 and the dynamic piston seal 42, with n3 and n4 delivering their contributions to mix into the inner chambers while simultaneously comprising fluid bearings and purge seals to enhance the performance of the dynamic seals separating the chambers. In an exemplary embodiment, a floating piston 4 within a cylinder 17 can be implemented and includes a flexible fluid connection 38.

Figure 5:
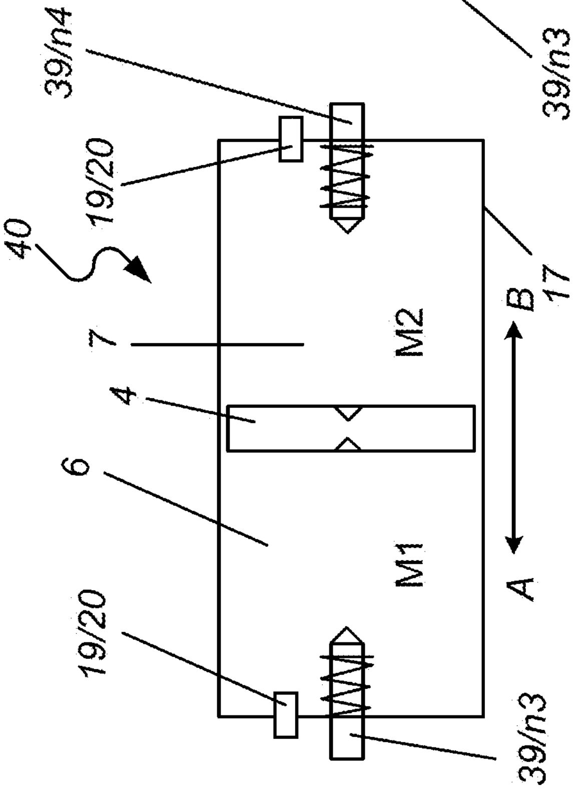

Referring to FIG. 5, there is illustrated one example of a DRCS-enabled pump 40 with an oscillating floating piston 4. In an exemplary embodiment, a DRCS physically decouples a mixing chamber from the array to stop that chamber from injecting the fluid. This is useful for mixing high ratios.

Figure 6:
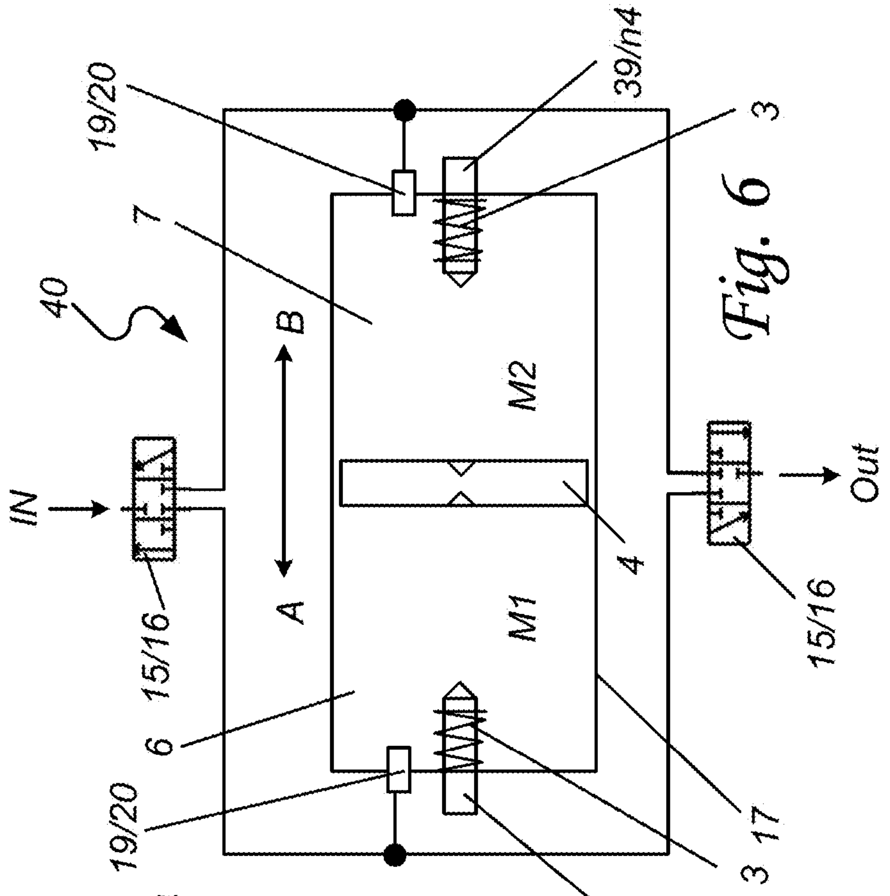
FIGS. 5-6 illustrates examples of a pump with an oscillating floating piston.

Referring to FIG. 6, there is illustrated one example of a DRCS-enabled pump with two valves 15 and manifolds 16 configured to oscillate the piston 4 between the known distances between positions A and B.

With reference to FIG. 6, the mechanism works as follows: the floating piston travels to point A until it contacts the actuator rod 39. The floating piston 4, using water pressure providing from manifolds 16 by valves 15, pushes the rod 39 back to "ready" or "position A" and compresses the spring 3. The chamber n3 is connected in compression to the rod 39; when the rod 39 gets pushed back, the floating piston is effectively "cocking" the n3 chamber and locating piston 4 into a known A position.

Though not in its known A position, FIG. 1D details a version of what is meant to be expressed on either end of the cylinder 17 illustrated in FIG. 6, where n4 from FIG. 1D is absent and the DRCS pump in FIG. 6 is operating in single action, and where FIG. 1D's piston 4 is floating and FIG. 1D's rod 21B and motive force 5 do not exist. Additionally, an entirely separate "mirror image" of the aforementioned DRCS pump arrangement is meant to be expressed on the opposite side of the piston 4 in FIG. 6 in place of FIG. 6's n4 chamber, where again n4 from FIG. 1D is absent.

Referencing FIG. 6, using the solenoids or oscillating valve, the computer switches the direction of the floating piston 4. The actuator rod 39 has a spring 3 that keeps it in contact with the floating piston 4 in compression. The floating piston 4 eventually travels to a point where rod 39 can no longer travel with it, position B, at which point the piston travels—floating—to the opposite end of the chamber that M1 and M2 share.

If multiple single-acting chambers are to be located on either end of cylinder 17 in FIG. 6, the arrangements that would stand in place of n3 and n4 in FIG. 6 become expressions of FIG. 1E, which itself is a version of FIG. 1D with mechanical provisions for multiple cylinders 17A and 17B from FIG. 1E. Referencing FIG. 1E as applied to a hypothetical multi-chamber version of FIG. 6, FIG. 1E's mixing pistons 4A and 4B each have their own spring 3 that keeps each mixing piston 4A and 4B in contact with rod 21A in compression. Since rod 21A is position-encoded via linear scale 13, the mixing chambers 17A and 17B have encoded positions also.

Referencing FIG. 1E as applied to a hypothetical multi-chamber version of FIG. 6, when FIG. 1E's floating piston 4 reverses, FIG. 1E's mixing chambers n3 and n4 begin to contribute their respective volumes to FIG. 1E's M1 chamber. As FIG. 6's floating version of FIG. 1E's piston 4 moves away toward chamber M2, the control system 100, as referenced in FIG. 2A, will use position data from linear scale 13 as illustrated in FIG. 1E to bypass FIG. 1E's n3 and n4 chambers. A bypass strategy, as illustrated by FIG. 1A, would result in FIG. 1E's piston 4A or 4B stopping during bypass. A bypass strategy, as illustrated by FIG. 1B, would result in FIG. 1E's piston 4A or 4B continuing until both are fully extended and no longer coupled by compression to FIG. 6's floating piston 4.

The computer control, as defined in FIG. 2A, selectively stops the injection of any number of mixing independently along the portion of the floating piston's transit that mechanical coupling via compression can be maintained.

Referencing FIG. 6, the computer is effectively "premixing" a ratiometric solution into M1 or M2, depending on the direction of piston 4. Such a solution is homogeneous despite its contributing flows having arrived asynchronously.

Figure 7:
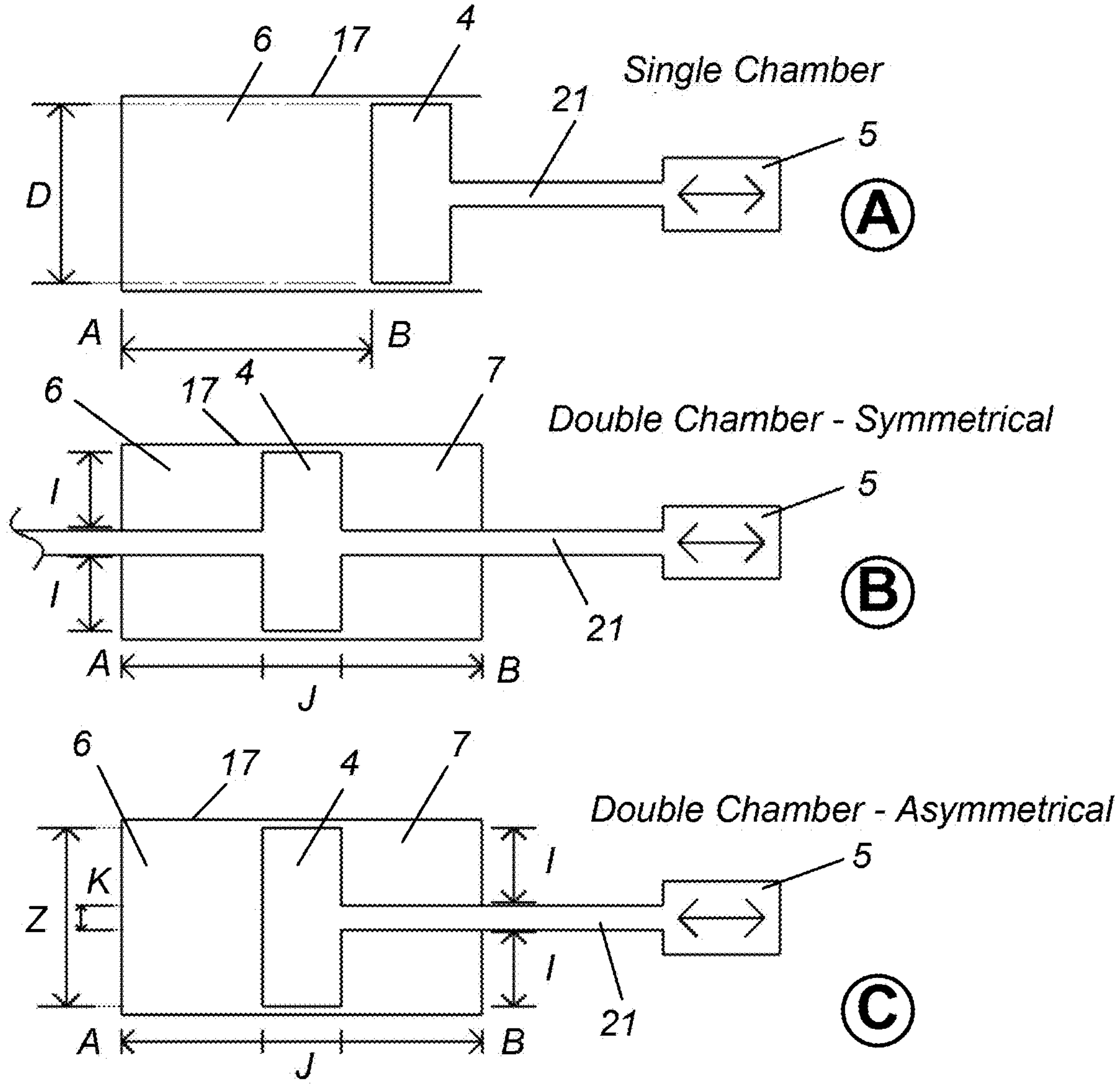
FIG. 7 illustrates one example of different types of chambers.

Referring to FIG. 7 there is illustrated one example of different types of chambers. In an exemplary embodiment, reference 'A' illustrates a single chamber 6 having a diameter 'D' and a sweep distance 'A-B'. Reference 'B' illustrates a double chamber 6/7 that is symmetrical, having a piston 4 width 'J', a linkage 21 to cylinder wall distance 'I' which reduces the volume of the chambers 6/7 symmetrically, and a sweep distance 'A-B'. Reference 'C' illustrates a double chamber that is asymmetrical, having a piston 4 width 'J', a linkage 21 to cylinder wall distance 'I', diameter 'K', which reduces the volume of chamber 7 only, thus asymmetrically with respect to chamber 6, and a sweep distance 'A-B'.

Figure 8:
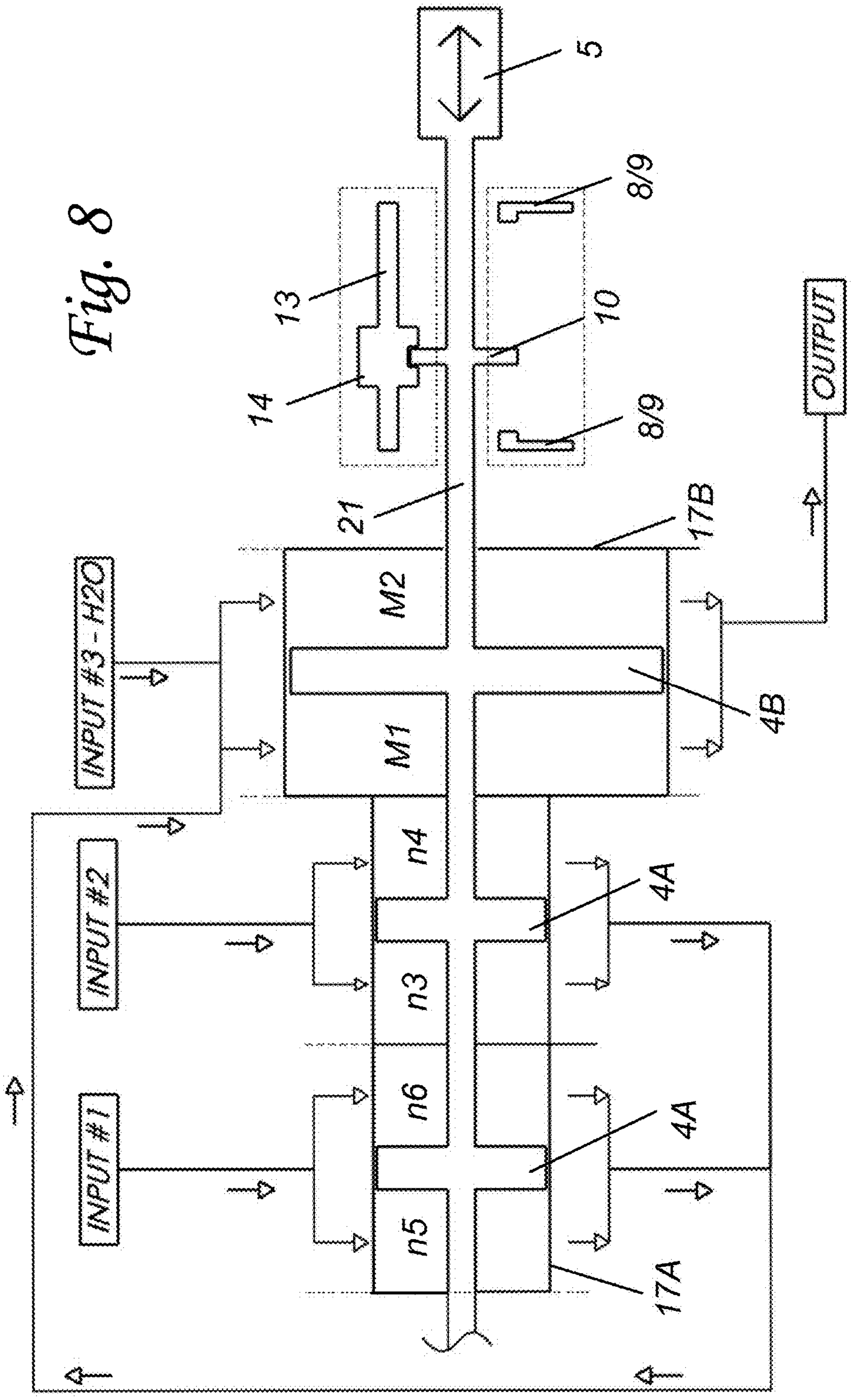
FIG. 8 illustrates different size cylinders and pistons to produce different ratiometric mixtures along a single sweep volume.

Referring to FIG. 8, there is illustrated one example of different-sized cylinders and pistons producing different ratiometric mixtures along a single sweep volume. In an exemplary embodiment, a single piston linkage 21 motion can create a swept volume as motor 5 moves the pistons 4A and 4B back and forth. Cylinder 17A can be one size, and cylinder 17B can be a different size. The pistons 4A and 4B are sized to fit their respective cylinders. In operation, as the motor moves the pistons 4A and 4B back and forth, the sweep distance is the same for each piston 4A and 4B; however, the sweep volume varies due to the different sized cylinders. This cylinder size difference allows volumes and ratios of fluids to be varied, as required and/or desired in a particular embodiment.

Figure 9:
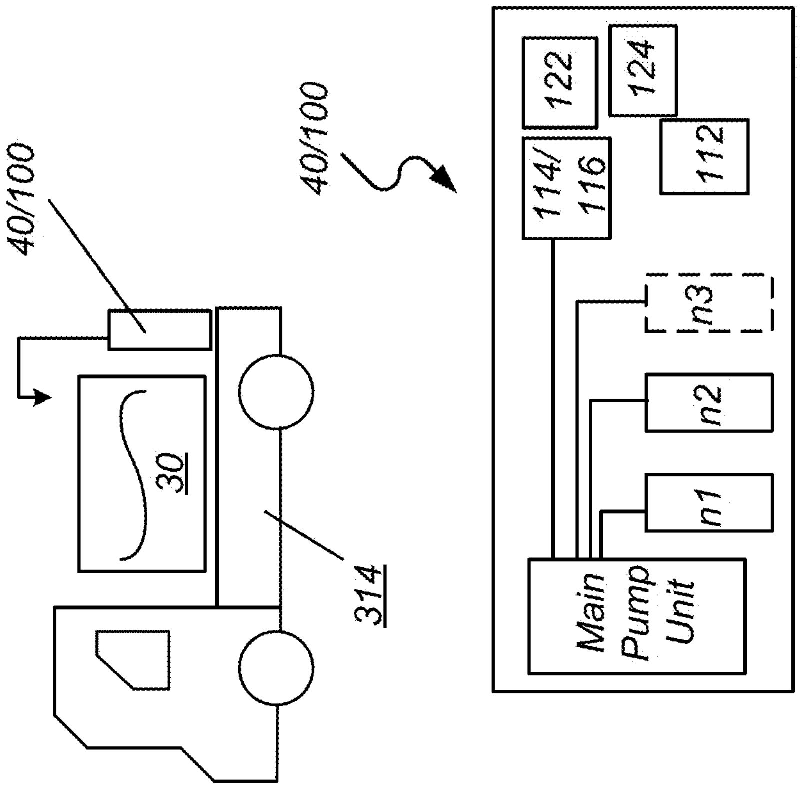
FIGS. 9 and 10 illustrate examples of agriculture applications.
Figure 10:
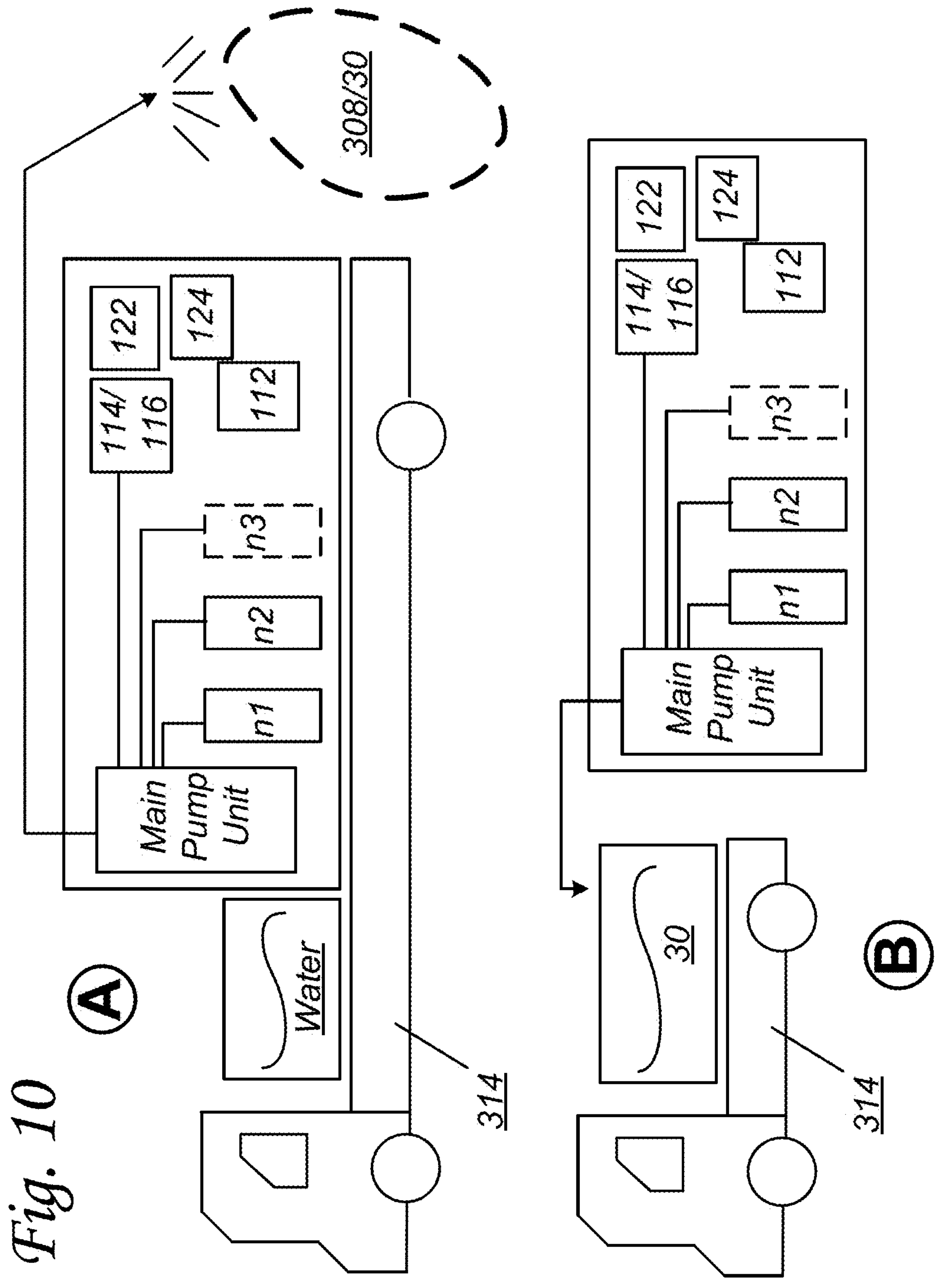

Referring to FIGS. 9 and 10, there are illustrated examples of agriculture applications using a DRCS-enabled fixed ratio piston proportioning pump 40. In an exemplary embodiment, a DRCS-enabled proportional pump 40 design can be used for very high mixture ratios that are commonly used in agricultural applications. In this regard, agricultural spraying works as follows:

- A water truck is filled with many thousands of gallons of water and driven to the field;
- The sprayer, a tractor with a smaller tank and banks of nozzles, is driven to the field;
- An operator uses a transfer pump to fill the sprayer tank with water;
- As the sprayer tank is filling, the operator dumps containers of concentrated product into the sprayer tank; and
- The operator drives into the field to spray the mix, then returns to start over.

Referring to FIGS. 9 and 10, there is illustrated examples of agriculture applications. In an exemplary embodiment, the present invention has value for spraying fluids in agricultural applications for the following reasons:

- The mix would be of higher precision and accuracy due to the elimination of human error:
- A partial batch could easily be made. In the case of FIG. 10, reference 'A', the operator just sprays on demand—there are no batches;
- In the case of FIG. 10, reference 'B', the operator could request a volume of mix, and the pump could shut itself off automatically at that target or when a sensor trips;
- The pump's design allows for concentrates of varying mix ratios, and the ratios could be programmed manually or automatically via QR code, RF tag, etc.; or
- Fitted with a wireless radio, the pump could use the radio to look up mix ratios from a database, log that a particular product was used in a particular field or place in a field, and restrict the farmer from diluting the mixture.

Using a design like the one referenced in at least FIGS. 9 and 10, the order of operation could be improved. In this regard, in FIG. 10, reference 'B', the pump is a freestanding unit. Water comes from the truck, through the transfer pump, and drives the DRCS-enabled proportioning pump. Canisters of concentrate are plumbed into the mixing chambers of the pump and may be "slotted" into the unit. While in FIG. 10, reference 'A', the same DRCS-pump is plumbed into the sprayer such that mixing happens on demand. The sprayer's tank is filled only with water.

Figure 11A:
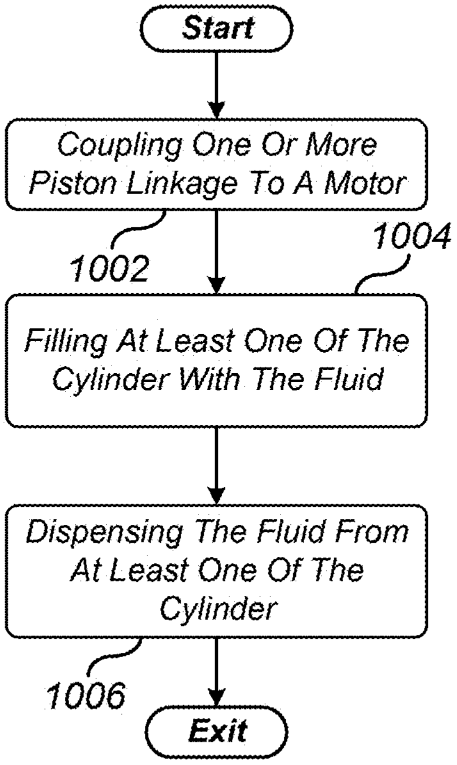
FIGS. 11A-11C illustrates one example of a method of dispensing a proportioned amount of fluid from a DRCS-enabled fixed ratio piston proportioning pump.

Referring to FIG. 11A, there is illustrated one example of a method of dispensing a proportioned amount of fluid from a DRCS-enabled fixed ratio piston proportioning pump 40. In an exemplary embodiment, the method begins in step 1002 by coupling one or more piston shafts 21 to a motor 5. The DRCS-enabled fixed ratio piston proportioning pump 40 can comprise at least one cylinder 17, at least one of a piston 4, and the piston linkage 21 connected at one end to the piston 4. The piston linkage 21 can be coupled to motor 5 in a manner that displaces piston 4 in a linear manner within cylinder 17. At least one chamber 6, for holding a fluid 30, is formed within the cylinder 17. Each of the chambers 6/7 can comprise an ingress port 19 and an egress port 20.

The method continues in step 1004 by filling at least one of the chambers 6/7 with the fluid 30, by way of the ingress port 19, as the piston moves in a manner that increases the volume of the chamber 6 or 7.

The method continues in step 1006 by dispensing the fluid 30 from at least one of the chambers 6 or 7, by way of the egress port 20, as the piston moves in a manner that decreases the volume of the chamber 6 or 7.

In operation, the amount of dispensed fluid 30 is proportional to the total piston displacement amount 302. The piston 4 continues a back-and-forth motion within cylinder 17 until the desired amount of fluid 30 is dispensed. The method is then exited.

In an exemplary embodiment, as may be required and/or desired in a particular embodiment, a rinsing cycle or a portion of a cycle can be devoted to rinsing.

Figure 11B:
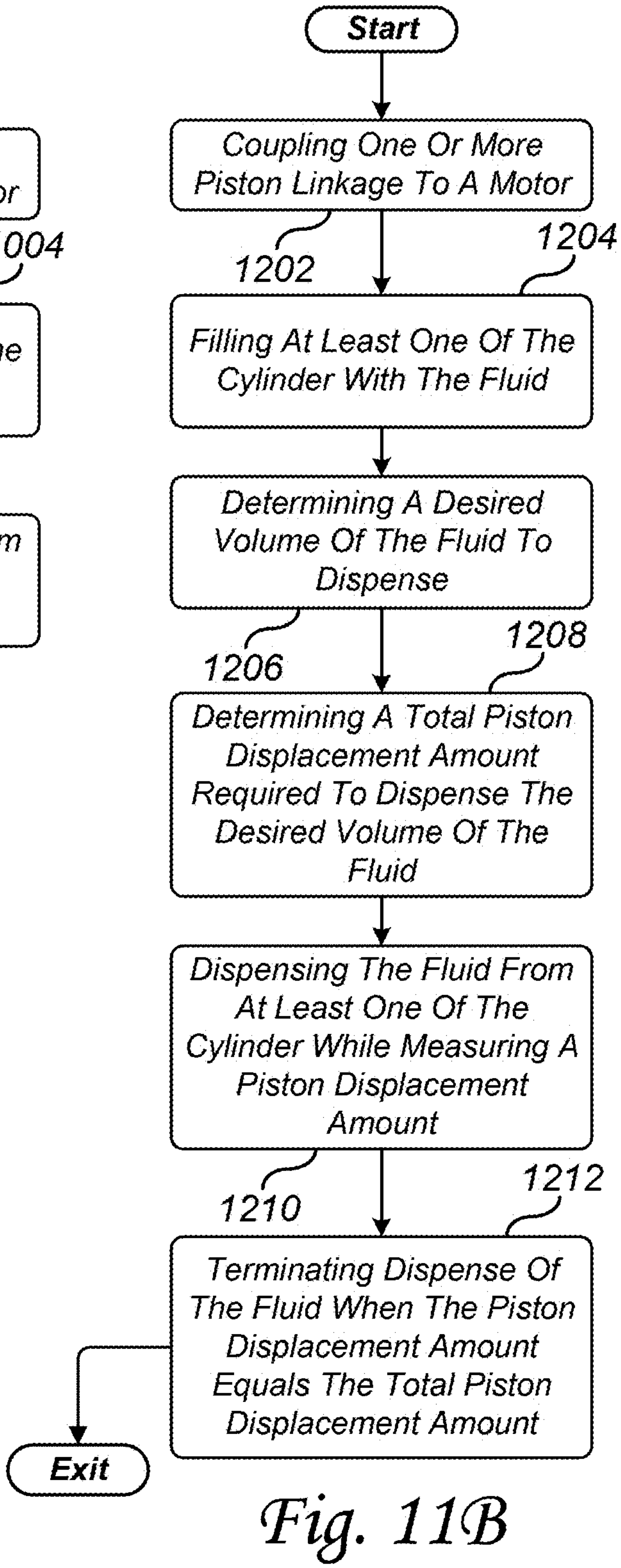

Referring to FIG. 11B, there is illustrated one example of a method of dispensing a proportioned amount of fluid from a DRCS-enabled fixed ratio piston proportioning pump 40. In an exemplary embodiment, the method begins in step 1202 by coupling one or more piston shafts 21 to a motor 5. The DRCS-enabled fixed ratio piston proportioning pump 40 comprises at least one cylinder 17, at least one piston 4, and the piston linkage 21 connects at one end to the piston 4. The piston linkage 21 can be coupled to motor 5 in a manner that displaces the piston 4 in a linear manner within cylinder 17. At least one chamber 6, for holding a fluid 30, is formed within the cylinder 17. Each of the chambers 6/7 comprises an ingress port 19 and an egress port 20.

The method continues in step 1204 by filling at least one of the chambers 6 or 7 with the fluid 30, by way of the ingress port 19, as the piston 4 moves in a manner that increases the volume of the chamber 6 or 7.

The method continues in step 1206 by determining a desired volume of the fluid 30 to dispense. In this regard, the desired volume can be set by control system 100, manually set by user 306, or set in other ways as may be required and/or desired in a particular embodiment.

The method continues in step 1208 by determining a total piston displacement amount, as an example illustrated as 302 in FIG. 1A, required to dispense the desired volume of the fluid 30.

The method continued in step 1210 by dispensing the fluid 30 from at least one of chambers 6 or 7, by way of the egress port 120, as piston 4 moves in a manner that decreases the volume of chamber 6 while measuring a piston displacement amount as the piston 4 moves.

The method continues in step 1212 by terminating the dispense of fluid 30 when the piston displacement amount equals the total piston displacement amount 302.

In operation, the amount of dispensed fluid 30 is proportional to the total piston displacement amount 302. The piston 4 continues a back-and-forth motion within cylinder 17 until the desired amount of fluid 30 is dispensed. The method is then exited.

In an exemplary embodiment, as may be required and/or desired in a particular embodiment, a rinsing cycle or a portion of a cycle can be devoted to rinsing.

Figure 11C:
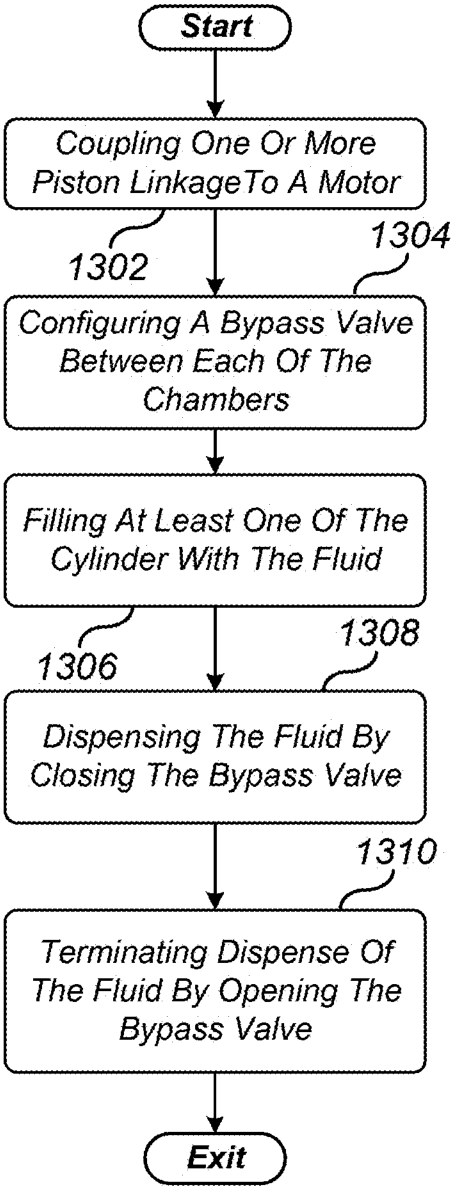

Referring to FIG. 11C, there is illustrated one example of a method of dispensing a proportioned amount of fluid from a DRCS-enabled fixed ratio piston proportioning pump 40. In an exemplary embodiment, the method begins in step 1302 by coupling one or more piston shafts 21 to a motor 5. The DRCS-enabled fixed ratio piston proportioning pump 40 comprises at least one cylinder 17, at least one piston 4, and the piston linkage 21 connects at one end to the piston 4. Piston linkage 21 is coupled to motor 5 in a manner that displaces piston 4, in a linear manner, within cylinder 17. At least one chamber 6 and 7, for holding a fluid 30, is formed within cylinder 17 on each side of the piston 4. Each of the chambers 6 and 7 comprises an ingress port 19 and an egress port 20.

The method continues in step 1304 by configuring a bypass valve 15 between each of the chambers 6 and 7.

The method continues in step 1306 by filling each of chambers 6 and 7 with the fluid, by way of the ingress ports 19, as the piston moves in a manner that increases the volume of chambers 6 or 7.

The method continues in step 1308 by dispensing the fluid 30 by closing the bypass valve 15, causing the fluid 30 to be dispensed through the egress port 20 as the piston moves 4.

The method continues in step 1310 by terminating the dispense of the fluid 30, by opening the bypass valve, causing the fluid 30 to be transferred between each of chambers 6 and 7 as piston 4 moves, abating the dispense of the fluid from the egress port 20.

Figure 11D:
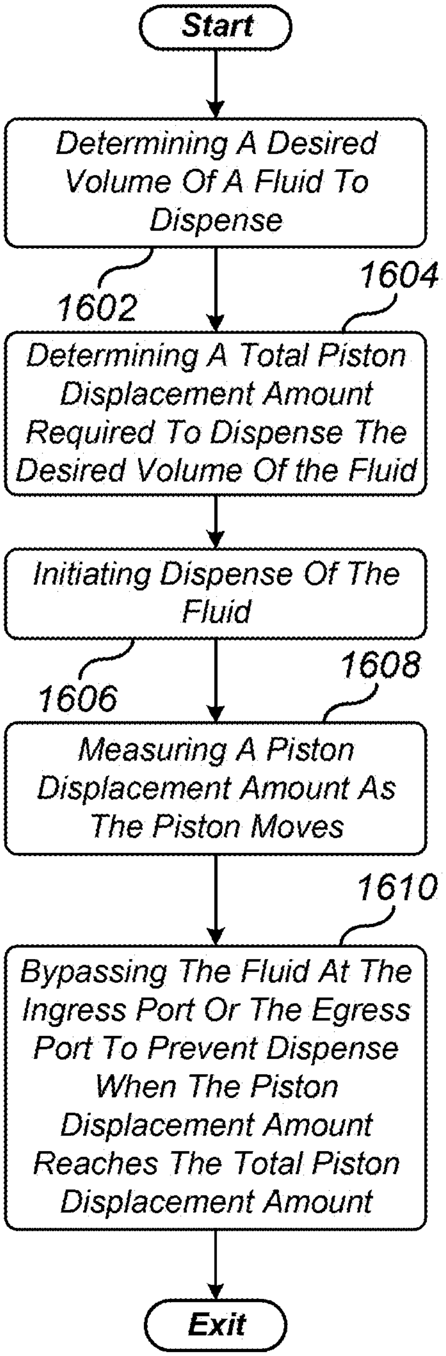
FIGS. 11D-11F illustrates examples of methods of dispensing flows of two or more fluids in varying ratios from a fixed ratio piston proportioning pump.

Referring to FIG. 11D, there is illustrated one example of a method of dispensing flows of two or more fluid streams in varying ratios from a DRCS-enabled fixed ratio piston proportioning pump. In an exemplary embodiment, the method begins in step 1602 by determining a desired volume of a fluid 30 to dispense. The fixed ratio piston proportioning pump 40 can comprise at least one cylinder 17, at least one piston 4, and a linkage 21 or 36 that connects at one end to piston 4. At least one chamber 6 or 7 is formed within the cylinder, on at least one side of piston 4, for holding fluid 30. Each of the chambers 6 or 7 can comprise an ingress port 19 and an egress port 20. Linkage 21 or 36 can be coupled to a motive force such as a motor 5, pressure ram, or other suitable linear actuator 37, or other suitable motive force in a manner that displaces piston 4, in a back-and-forth manner, within cylinder 17.

The method continues in step 1604 by determining the total piston displacement amount required to dispense the desired volume of the fluid. In this regard, a calculation, by way of control system 100, manual setting, or other suitable methods, as to how far the piston 4, given the chamber volume (i.e. n1, n2, n3, n4, . . . nx) of the chamber 6 or 7, has to be displaced to dispense the total piston displacement amount. Such displacement for large volumes of fluid 30, to be dispensed may require the piston to oscillate back and forth many times.

The method continues in step 1606 by initiating the dispense of fluid 30 from the egress port 20 by setting at least one bypass valve 15 to a first state. Such a first state can be closed or open, depending on pump configuration, and such bypass valve 15 second state is the opposite of the first state. In this regard, if the first state is closed, then the second state is open. In the alternative, if the first state is open, then the second state is closed.

The method continues in step 1608 by measuring a piston displacement amount as piston 4 moves to determine when the total piston displacement amount has been achieved. Such a piston displacement amount can be measured by the displacement determining device 120 or other suitable methods.

The method continues in step 1610 by bypassing fluid 30 at ingress port 19 or egress port 20 by setting at least one bypass valve 15 to a second state, preventing the dispense of fluid 30 while piston 4 continues to move when the piston displacement amount reaches the total piston displacement amount desired to dispense the desired volume of fluid 30 or mix of fluids 30. The method is then exited.

Figure 11E:
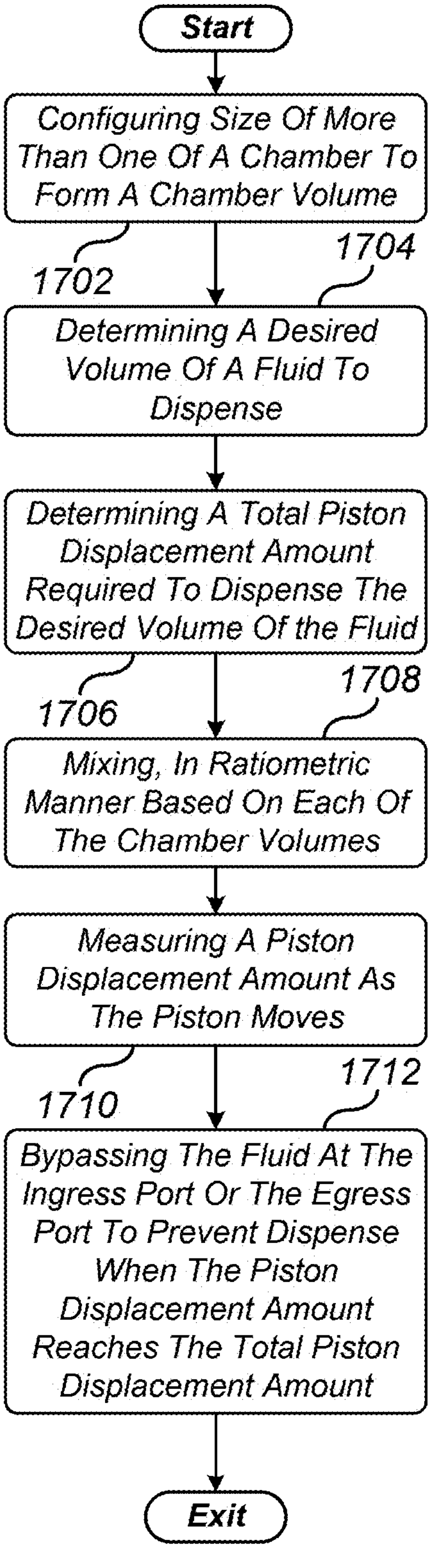
Figure 11F:
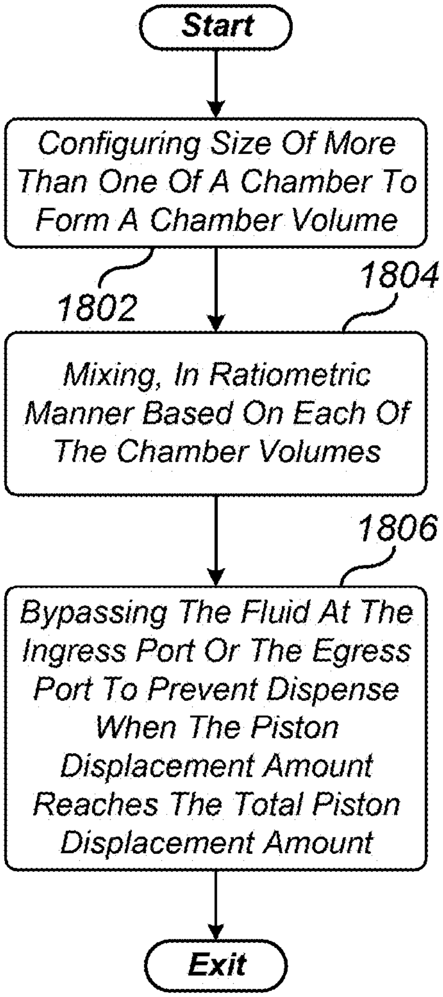

Referring to FIG. 11E, there is illustrated one example of a method of dispensing flows of two or more fluid 30 streams in varying ratios from a fixed ratio piston proportioning pump. In an exemplary embodiment, the method begins in step 1702 by configuring the size of more than one chamber 6/7 to form, for each chamber 6/7, a chamber volume (i.e. n1, n2, n3, n4, . . . nx). The fixed ratio piston proportioning pump 40 comprises at least one cylinder 17, at least one piston 4, and a linkage 21 or 37 that connects at one end to the piston 4. Each of the chambers 6/7 is formed within cylinder 17, on at least one side of piston 4 for holding fluid 30, each of the chambers 6/7 can comprise an ingress port 19 and an egress port 20. Linkage 21 or 36 can be coupled to a motive force such as motor 5, pressure ram, or other suitable linear actuator 37, or other suitable motive force in a manner that displaces piston 4, in a back-and-forth back and forth, manner within cylinder 17.

The method continues in step 1704 by determining the desired volume of a fluid to dispense. In an exemplary embodiment, user 306 can provide suitable input to pump 40, indicating how much of the fluid to dispense.

The method continues in step 1706 by determining the total piston displacement amount required to dispense the desired volume of the fluid. In this regard, a calculation, by way of control system 100, manual setting, or other suitable methods, as to how far the piston 4, given the volume (i.e. n1, n2, n3, n4, . . . nx) of the chamber 6 or 7, has to be displaced to dispense the total piston displacement amount. Such displacement for large volumes of fluid 30 to be dispensed, may require the piston to oscillate back and forth many times.

The method continues in step 1708 by mixing, in a ratiometric manner based on each of the chamber volumes, at least two separate streams of the fluid, by setting at least one bypass valve 15 to a first state, causing at least two separate streams of the fluid to be dispensed from more than one of the chambers 6/7.

The method continues in step 1710 by measuring a piston displacement amount as piston 4 moves to determine when the total piston displacement amount has been achieved. Such a piston displacement amount can be measured by the displacement determining device 120 or other suitable methods.

The method continues in step 1712 by bypassing fluid 30 at ingress port 19 or egress port 20 by setting at least one bypass valve 15 to a second state, preventing the dispense of fluid 30 while piston 4 continues to move when the piston displacement amount reaches the total piston displacement amount desired to dispense the desired volume of fluid 30 or mix of fluids 30. The method is then exited.

Referring to FIG. 11E, there is illustrated one example of a method of dispensing flows of two or more fluid streams in varying ratios from a fixed ratio piston proportioning pump. The method begins in step 1802 by configuring the size of more than one chamber 6/7 to form, for each of the chambers 6/7, a chamber volume (i.e. n1, n2, n3, n4, . . . nx). The fixed ratio piston proportioning pump comprises at least one cylinder 17, and at least one piston 4. Each of the chambers 6/7 is formed within cylinder 17 for holding a fluid 30. Each of the chambers 6/7 comprises an ingress port 19 and an egress port 20. Piston 4 is displaced by the injection of fluid 30 into one of the chambers 6 or 7.

The method continues in step 1804 by mixing, in a ratiometric manner based on each of the chamber volumes, at least two separate fluid streams of fluid 30, by setting at least one bypass valve 15 to a first state, causing at least two separate fluid streams of fluid 30 to be dispensed from more than one of the chambers 6/7.

The method continues in step 1806 by bypassing the fluid at the ingress port 19 or the egress port 20 by setting at least one of the bypass valves 15 to a second state, preventing the dispensing of fluid 30. The method is then exited.

Figure 12A:
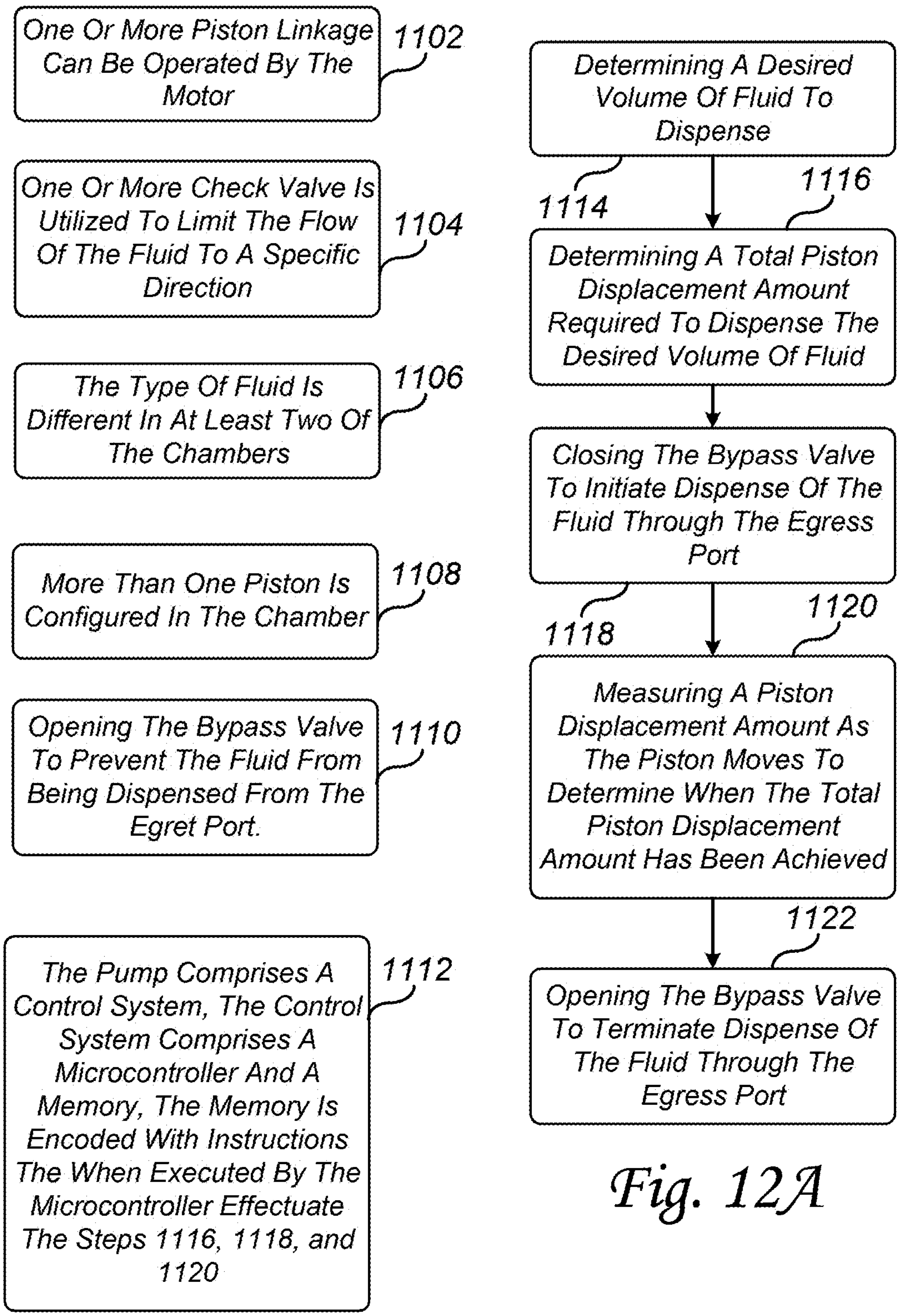
FIG. 12A-12D illustrates exemplary embodiments that can be used interchangeably with the methods of the present invention.

Referring to FIG. 12A, there are illustrated exemplary embodiments that can be used interchangeably with the methods of the present invention.

In step 1102, more than one piston linkage 21 can be operated by motor 5. Each of the piston shafts 21 can be installed in a separate chamber.

In step 1104, one or more check valves can be utilized to limit the flow of the fluid to a specific direction through interconnected ingress ports, egress ports, tubes, conduits, couplings, plumbing, pipes, and other fitments.

In step 1106, the type of fluid is different in at least two of the chambers.

In step 1108, more than one piston is configured in the chamber.

In step 1110, a bypass valve is opened to prevent the fluid from being dispensed from the egress port. The bypass valve is coupled to each of the chambers. When the bypass valve is open, the fluid transfers between each of the chambers as the piston moves. When the bypass valve is closed, the fluid is dispensed through the egress port as the piston moves.

In step 1112, the pump comprises a control system 100. The control system 100 comprises a microcontroller and memory. The microcontroller is operationally related to the memory. The memory is encoded with instructions that, when executed by the microcontroller, effectuate the steps of closing the bypass valve to initiate the dispense of the fluid, measuring a piston displacement amount as the piston moves, and opening the bypass valve to terminate the dispense.

In step 1114, the desired volume of fluid to dispense is determined. The method then moves to step 1116.

In step 1116, the total piston displacement amount required to dispense the desired volume of fluid is determined. The method then moves to step 1118.

In step 1118, the bypass valve is closed to initiate the dispensing of the fluid through the egress port. The method then moves to step 1120.

In step 1120, a piston displacement amount is measured as the piston moves to determine when the total piston displacement amount has been achieved. The method then moves to step 1122.

In step 1122, the bypass valve is opened to terminate the dispensing of the fluid through the egress port, wherein the desired volume of fluid is dispensed based on the total piston displacement amount.

Figure 12B:
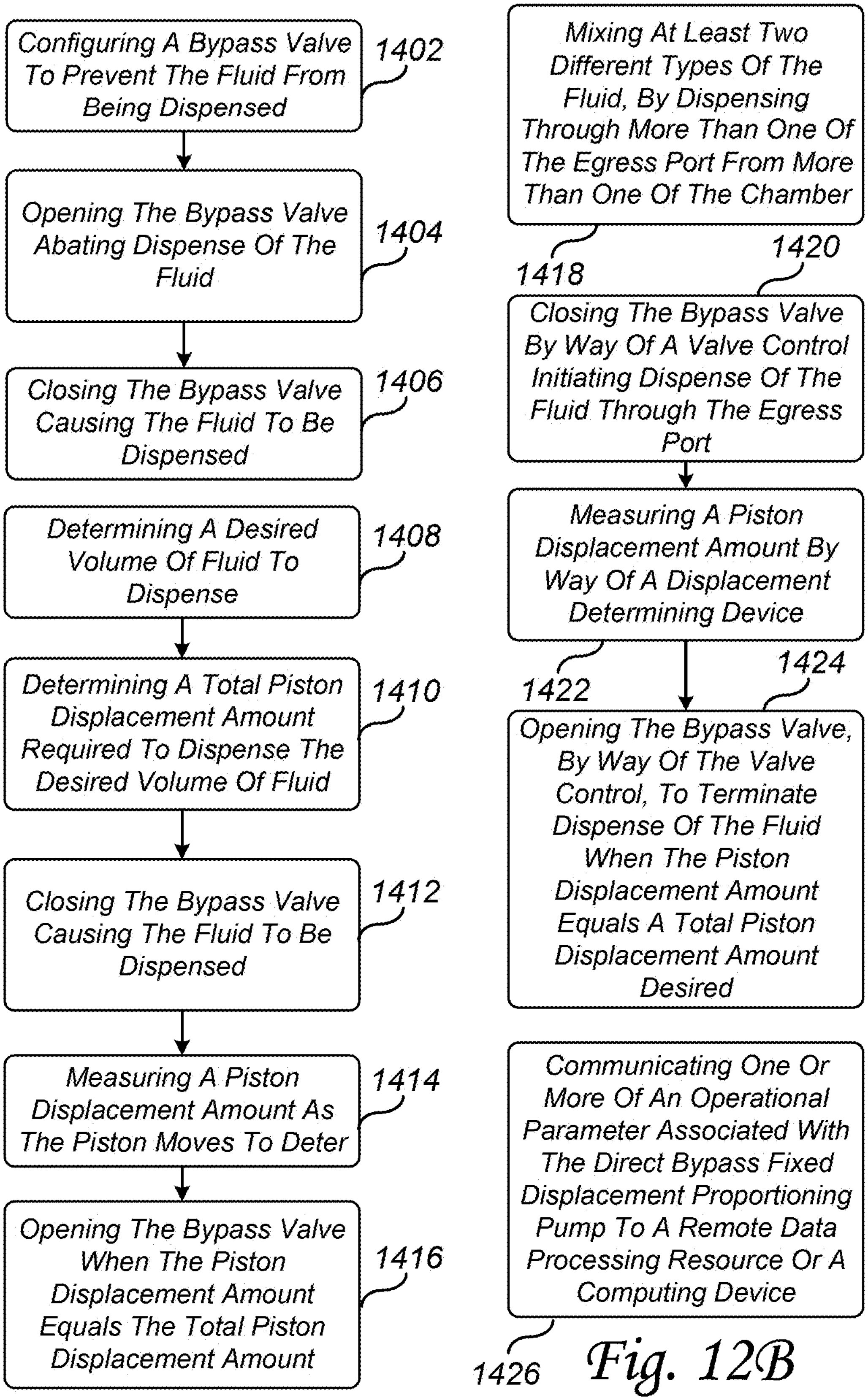

Referring to FIG. 12B, there are illustrated exemplary embodiments that can be used interchangeably with the methods of the present invention.

In step 1402, a bypass valve 15 can be configured to prevent the fluid 30 from being dispensed from the egress port 20. A separate chamber 6/7, for holding the fluid 30, is formed, within cylinder 17, in an exemplary embodiment, on both sides of piston 4. The bypass valve 15 can be coupled between each of the chambers 6/7. The method then moves to step 1404.

In step 1404, bypass valve 15 is opened, transferring the fluid 30 between each of the chambers 6/7, abating the dispense of fluid 30 as the piston 4 moves. The method then moves to step 1406.

In step 1406, the bypass valve can be closed, causing fluid 30 to be dispensed through the egress port 20 as the piston 4 moves.

In step 1408, a desired volume of fluid 30, to dispense is determined. Such determination can be a manually set control, a setting determined by the control system 100, or other suitable ways of determining a desired volume of fluid 30 to dispense, as may be required and/or desired in a particular embodiment. The method then moves to step 1410.

In step 1410, the total piston displacement amount required to dispense the desired volume of the fluid 30 is determined. Represented as 302 in FIG. 1A, the total piston displacement amount is the distance the piston 4 has to move back and forth within the cylinder to dispense the desired volume of fluid 30. The method then moves to step 1412.

In step 1412, the bypass valve 15 is closed, initiating the dispense of the fluid 30 through the egress port 20. The method then moves to step 1414.

In step 1414, a piston displacement amount is measured as the piston 4 moves to determine when the total piston displacement amount has been achieved. The method then moves to step 1416.

In step 1416, bypass valve 15 can be opened to terminate the dispense of fluid 30 through egress port 20 when the piston displacement amount equals the total piston displacement amount. In this regard, when the actual measured piston displacement amount equals the predetermined total piston displacement amount necessary to dispense the desired amount of fluid 30.

In step 1418, at least two separate streams of fluid 30 can be mixed by dispensing through more than one egress port 20 from more than one chamber 6/7. In this regard, the same fluid 30 or different fluids 30 can be dispensed from different clambers and mixed through a manifold 16 or mixed by other suitable methods.

In step 1420, the bypass valve 15 can be closed, by way of a valve control 116, to initiate the dispense of fluid 30 from chamber 6/7 through the egress port 20. A control system 100 can comprise a microcontroller 102, the valve control 116, and a displacement determining device 120. The valve control device 116 and the displacement determining device 120 are operationally related to the microcontroller 102. The method then moves to step 1422.

In step 1422, a piston displacement amount is measured by way of the displacement determining device 120, as piston 4 moves back and forth in cylinder 17. The method then moves to step 1424.

In step 1424, bypass valve 15, by way of valve control 116, can be opened to terminate the dispense of fluid 30 when the piston displacement amount equals the total piston displacement amount desired. In this regard, when the actual measured piston displacement amount measured by the displacement determining device 120 equals the predetermined total piston displacement amount necessary to dispense the desired amount of the fluid 30.

In step 1426, one or more operational parameters associated with the DRCS-enabled fixed ratio piston proportioning pump can be data communicated to a remote data processing resource 202 or a computing device 232.

Figure 12C:
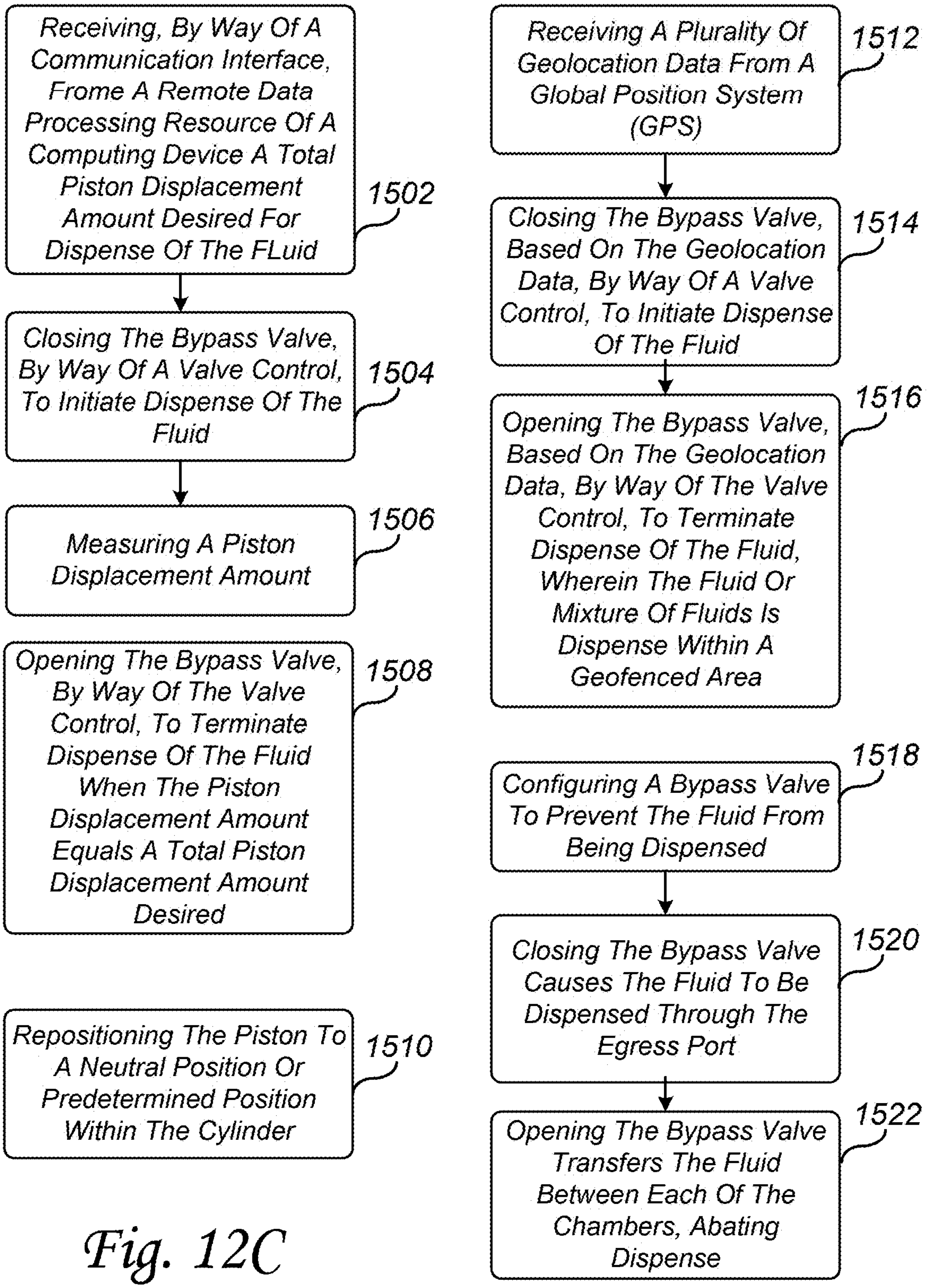

Referring to FIG. 12C, there are illustrated exemplary embodiments that can be used interchangeably with the methods of the present invention.

In step 1502, receiving, by way of a communication interface 124, from a remote data processing resource 202 or a computing device 232, a total piston displacement amount desired for dispensing of fluid 30. The method then moves to step 1504.

In step 1504, the bypass valve 15 can be closed by way of valve control 116 to initiate the dispense of fluid 30 from chamber 6/7 through the egress port 20. A control system 100 can comprise a microcontroller 102, a communication interface 124, the valve control 116, and the displacement determining device 120. The communication interface 124, the valve control 116, and the displacement determining device 120 are operationally related to the microcontroller 102. The method then moves to step 1506.

In step 1506, a piston displacement amount is measured by way of a displacement determining device 120, as piston 4 moves back and forth in cylinder 17. The method then moves to step 1508.

In step 1508, bypass valve 15 can be opened, by way of valve control 116, to terminate the dispense of fluid 30 when the piston displacement amount equals the total piston displacement amount desired.

In step 1510, piston 4 can be repositioned to a neutral position or a predetermined position within the cylinder absence of force applied by motor 5 by way of a spring 3 positioned within cylinder 17 located on the opposite side of piston 4 from the piston linkage 21.

In step 1512, a global positioning system (GPS) 122 can receive a plurality of geolocation data. A control system 100 can comprise a microcontroller 120, the GPS 122, and a valve control 116. The GPS 122 and the valve control 116 are operationally related to the microcontroller 102. The method then moves to step 1514.

In step 1514, the bypass valve 15 is closed, based on the geolocation data, by way of the valve control 15 to initiate the dispense of fluid 30 from the chamber 6/7 through the egress port 20. Fluid 30 is dispensed within a geofenced area 308 defined by the geolocation data. The method then moves to step 1516.

In step 1516, bypass valve 15 is opened, based on the geolocation data, by way of valve control 116, to terminate the dispense of fluid 30. In operation, fluid 30 or a mixture of more than one stream of the same fluid 30 or different types of fluids 30 can be mixed and dispensed within the geofenced area 308. In this regard, as one example and not a limitation, geofencing 308 a crop within an agricultural area 310 and limiting the dispense of mixture/fluid 30, such as fertilizer, insecticide, or other inside the geofenced area 308 (or alternatively outside the geofenced area).

In step 1518, a bypass valve 15 is configured to prevent fluid 30 from being dispensed from the egress port 20. A separate at least one of the chambers 6 or 7, for holding fluid 30, is formed, within cylinder 17, on both sides of piston 4, the bypass valve 15 can be coupled between each of the chambers 6/7. The method then moves to step 1520.

In step 1520, the bypass valve 15 can be closed, causing fluid 30 to be dispensed through the egress port 20 as the piston moves back and forth in the cylinder. The method then moves to step 1522.

In step 1522, bypass valve 15 can be opened, transferring fluid 30 between each of the chambers 6/7, abating the dispense of fluid 30 as the piston 4 moves back and forth within the cylinder 17.

Figure 12D:
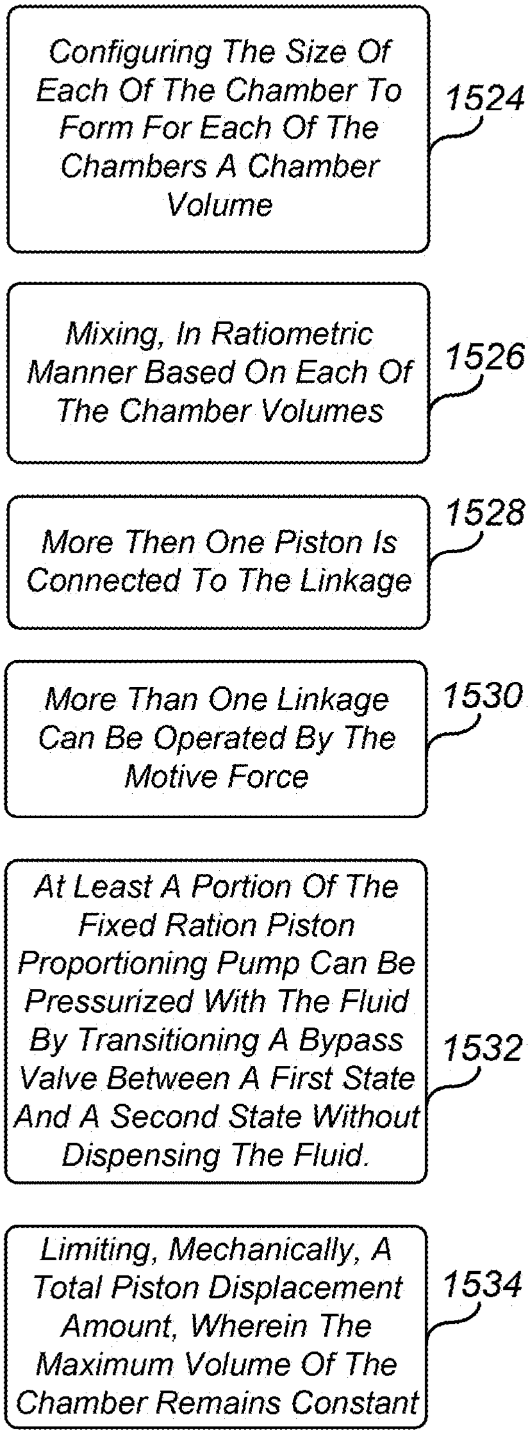

Referring to FIG. 12D, there are illustrated exemplary embodiments that can be used interchangeably with the methods of the present invention.

In step 1524, the size of each of the chambers 6/7 can be configured to form, for each of the chambers 6/7, a chamber volume (i.e. n1, n2, n3, n4, . . . nx).

In step 1526, each of the chambers 6/7 can be mixed, in a ratiometric manner based on each of the chamber volumes (i.e. n1, n2, n3, n4, . . . nx). At least two separate streams of fluid 30 can be dispensed through more than one of the egress ports 20 from more than one of the chambers 6/7.

In step 1528, more than one piston 4 can be configured in cylinder 17 and interconnected to linkage 21 or 36, forming at least one of the chambers 6/7 on each side of each of piston 4.

In step 1530, more than one linkage 21 or 36 can be operated by the motive force, such as motor 5, pressure ram, or other suitable linear actuator 37, or other suitable motive force. Each of the linkages 21 or 36 can be attached to at least one of the pistons 4 in a separate one of the cylinders 17.

In step 1532, at least a portion of the fixed ratio piston proportioning pump 40 can be pressurized with the fluid 30 by transitioning at least one of the bypass valves 15 between a first state and a second state without dispensing the fluid.

In step 1534, the total piston displacement amount can be limited, mechanically, so that the maximum volume of the chamber volume remains constant. In this regard, in applications where the piston floats, as in example FIGS. 5 and 6, to prevent the floating piston 4 from traversing too far within the cylinder 17 it can be mechanically limited, such as by tether or other suitable method.

Figure 13:
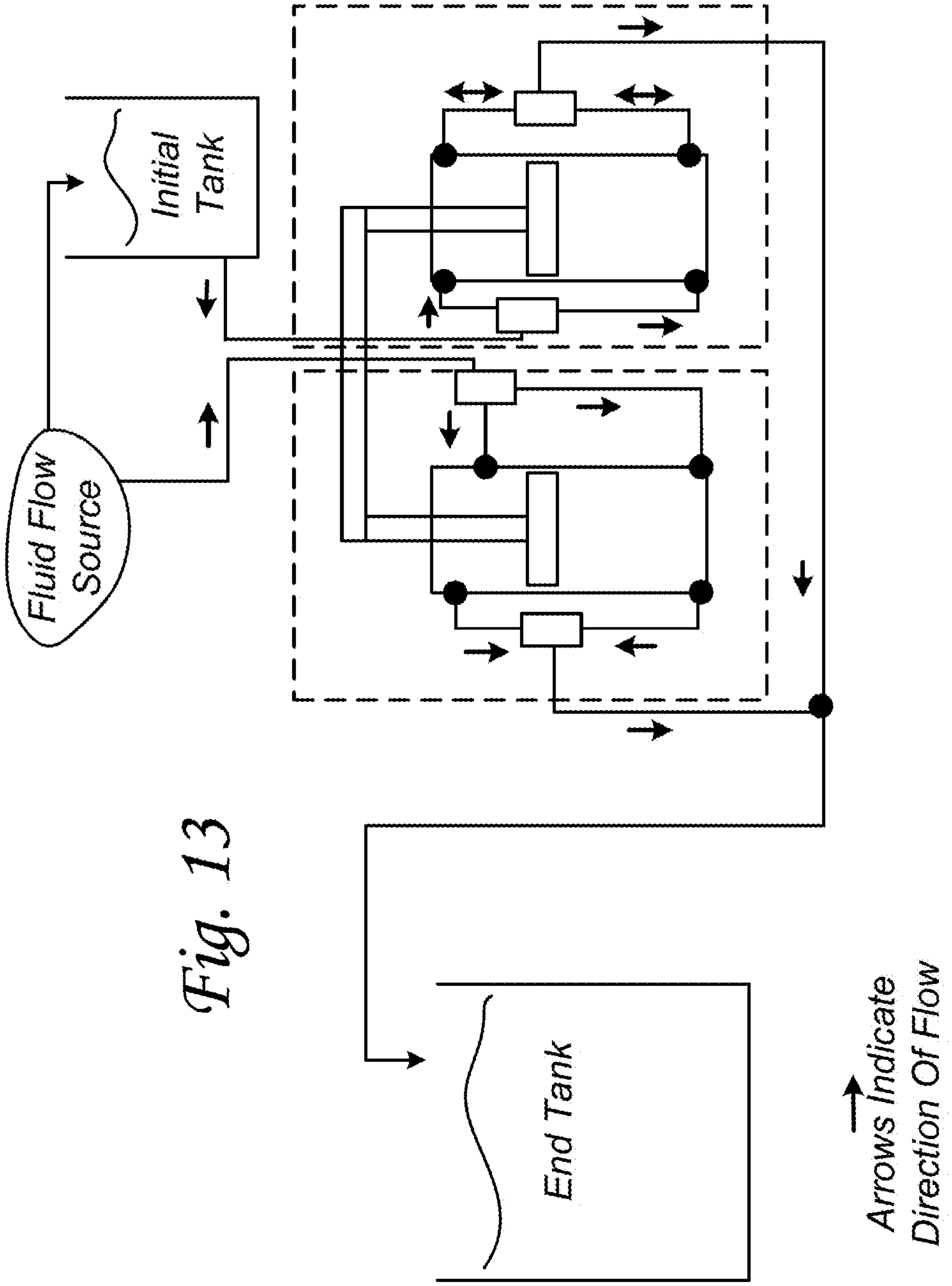
FIG. 13 illustrates one example of a pump configured for proportioning from multiple flows of the same fluid: a source and an initial tank that is functioning as an accumulator.

Referring to FIG. 13, there is illustrated one example of a pump configured for proportioning from multiple flows of the same fluid: a source and an initial tank that is functioning as an accumulator. In this same fluid exemplary embodiment, the pump configuration is not particularly limited. An operational hypothesis is that some source of fluid flow exists, and the fluid needs to be moved somewhere and metered. In addition, some of the fluid is also being dumped into an accumulation tank.

During pumping, the DRCS-pump can take some proportion of what's in the accumulation tank and add it to whatever is coming out of the original flow source. Attributes of this pump configuration include the ability to work with more than one accumulator/reservoir/buffer simultaneously.

There are a number of reasons to move fluid this way, including but not limited to a) the pumping operation might need to be intermittent, and the fluid flow can't be shut off; b) the pumping operation might require a variable flow rate that is greater than the flow source; c) one or all of the tanks might be cooled or heated somehow, so taking a metered continuously variable proportion could be used to regulate fluid temperature. In the case of multiple tanks, the pump could be used to load balance all tank temperatures at some variable coolant flow and variable coolant temperature; or d) the bypass flow from the accumulator tank might need to be kept separate for some reason and not even recombined with the original flow.

Figure 14:
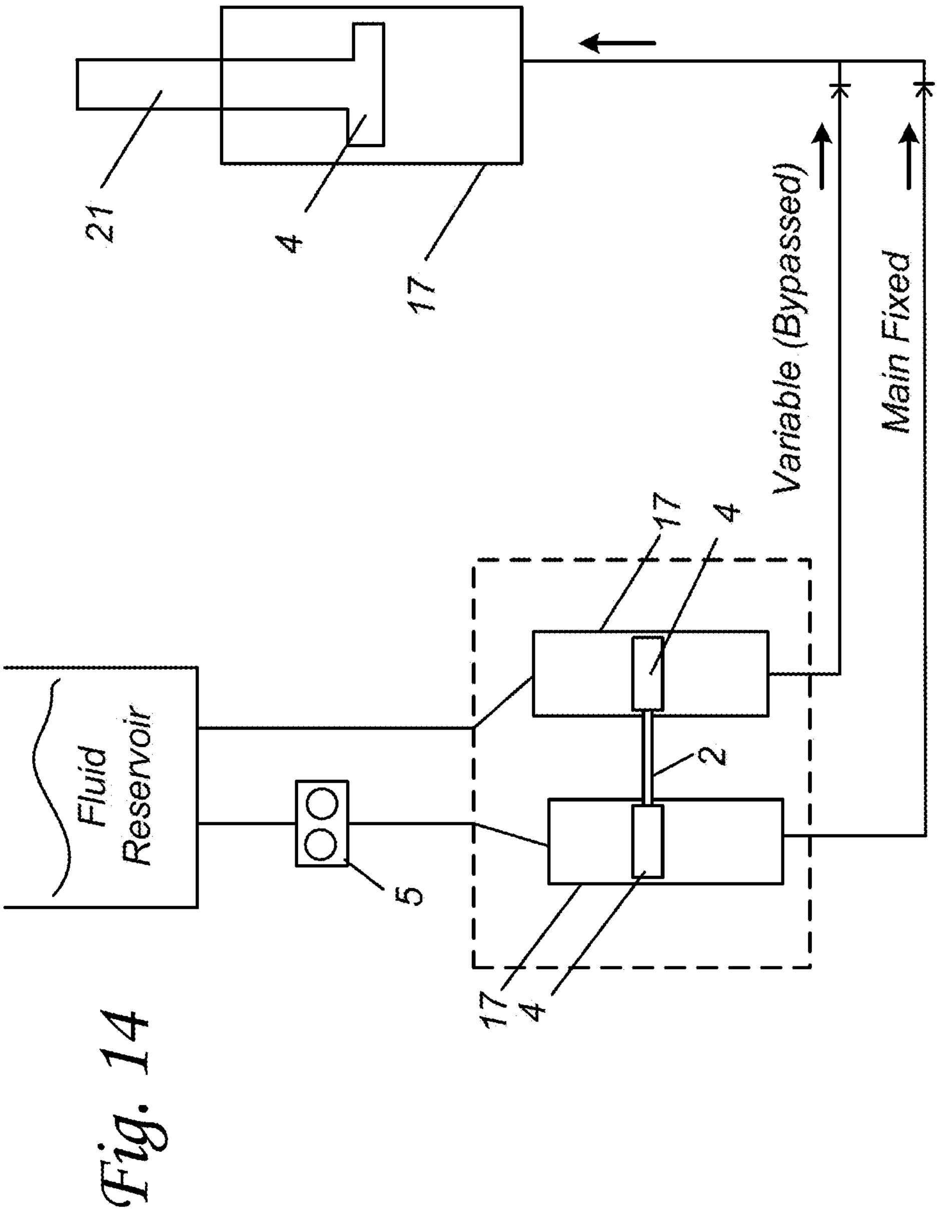
FIG. 14 illustrates one example of a mechanism for variable mechanical advancement of a single position of an actuator.

Referring to FIG. 14, there is illustrated one example of a mechanism for variable mechanical advancement of a single position of an actuator. These same fluid exemplary embodiments are all examples of "regenerative circuits", which is to say that the same-fluid pumps work off the principle of using pressure to add extra flow.

An operating hypothesis is that some volume of fluid flow comes from somewhere and is meant to move something via a hydraulic ram or motor of some kind. The pump again trades some of the flow pressure for volume. The reasons for doing this might be that some part of the machine being driven might need to always be moved some amount, but could need to be moved a bit more for some reason.

Figure 15:
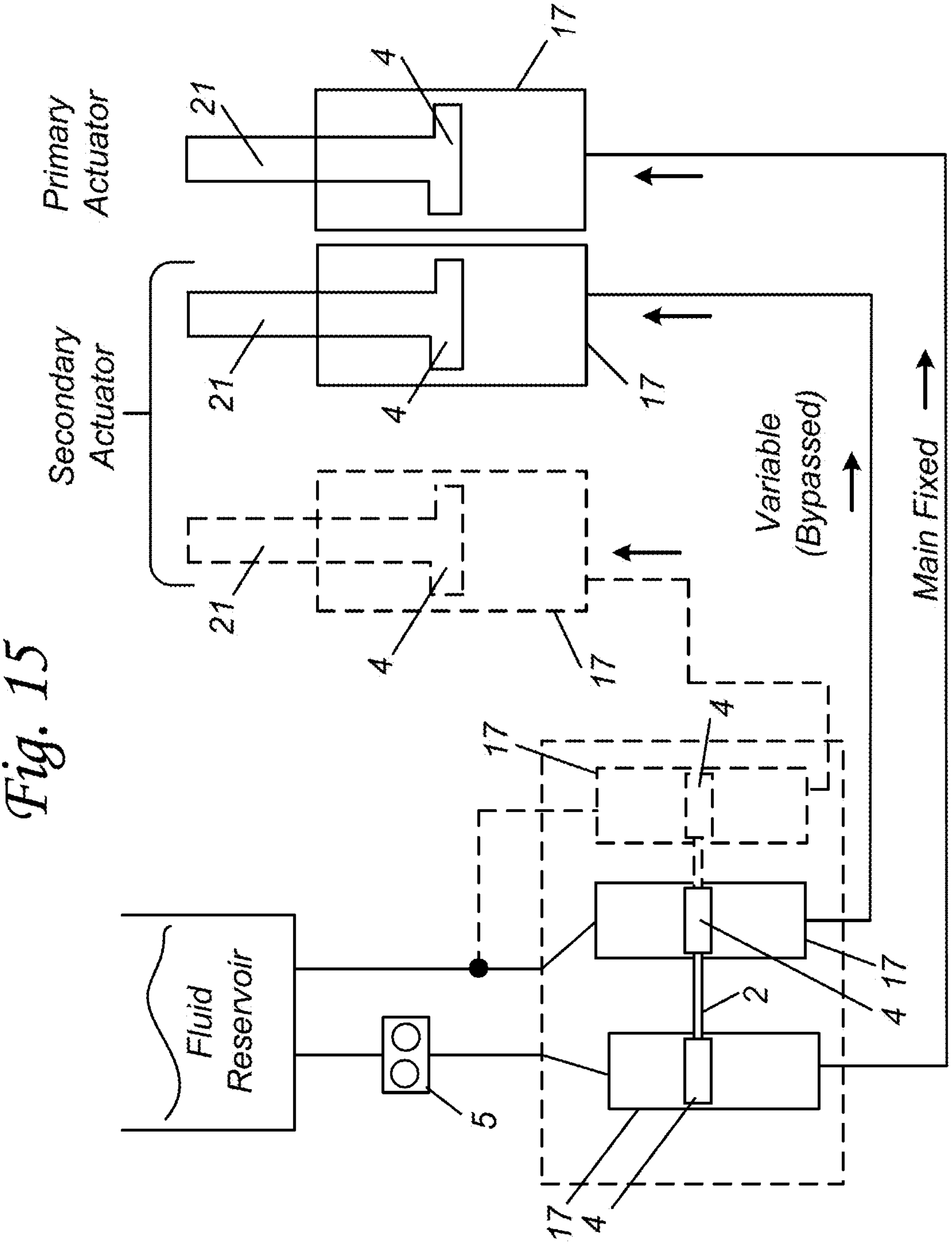
FIG. 15 illustrates one example of a mechanism for fixed mechanical advancement of a primary actuator with synchronous, variable mechanical advancement of a secondary actuator.

Referring to FIG. 15, there is illustrated one example of a mechanism for the fixed mechanical advancement of a primary actuator with synchronous, variable mechanical advancement of a secondary actuator. These same fluid exemplary embodiments are all examples of "regenerative circuits", which is to say that the same-fluid pumps work off the principle of using pressure to add extra flow.

An operating hypothesis is that some volume of fluid flow comes from somewhere and is meant to move something via a hydraulic ram or motor of some kind. The pump again trades some of the flow pressure for volume. The reasons for doing this might be as follows: a) the mechanical linkage of the driven machine might need to have some other secondary actuator moved, sometimes, some variable distance, synchronous with the main actuator; or b) the desire to have an unlimited number of secondary actuators with unique synchronous variable advancements.

Figure 16:
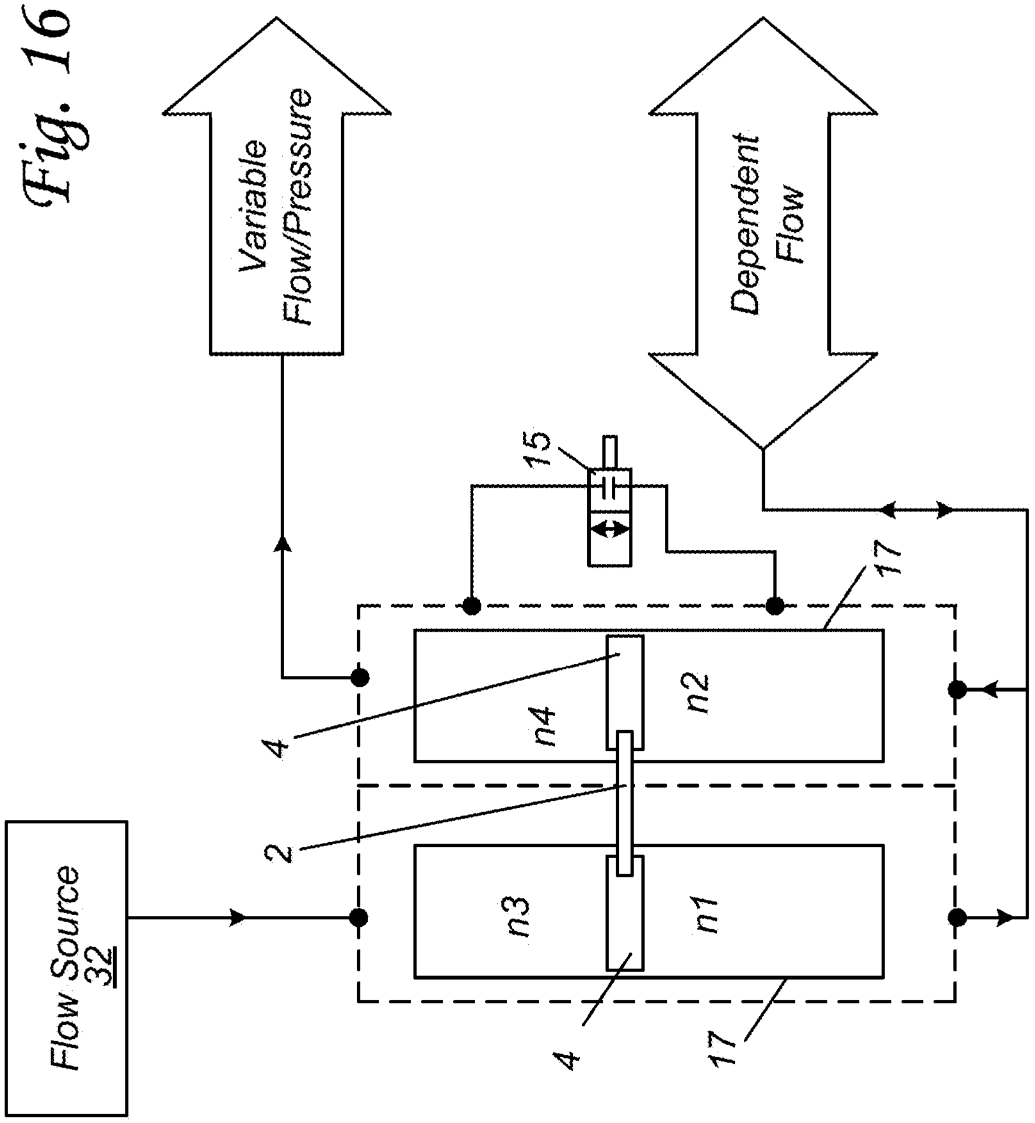
FIG. 16 illustrates one example of a mechanism configured as a flow splitter of a single fluid into one variable flow.

Referring to FIG. 16, there is illustrated one example of a mechanism configured as a flow splitter of a single fluid into one variable flow. In this exemplary embodiment, the pump uses a flow source 32 to pump its own output back through its bypass and produces two or more separate, variable, metered flows. One of them is a "dependent" flow, in the sense that it's dictated in a predictable way by whatever is being done to the variable flows. In certain embodiments, the dependent flow can be negative. Additionally, if the fluid is compressible, changes in the cylinder diameters or the mechanical linkage 2 between pistons could be used to change the output flow and pressure.

Figure 17:
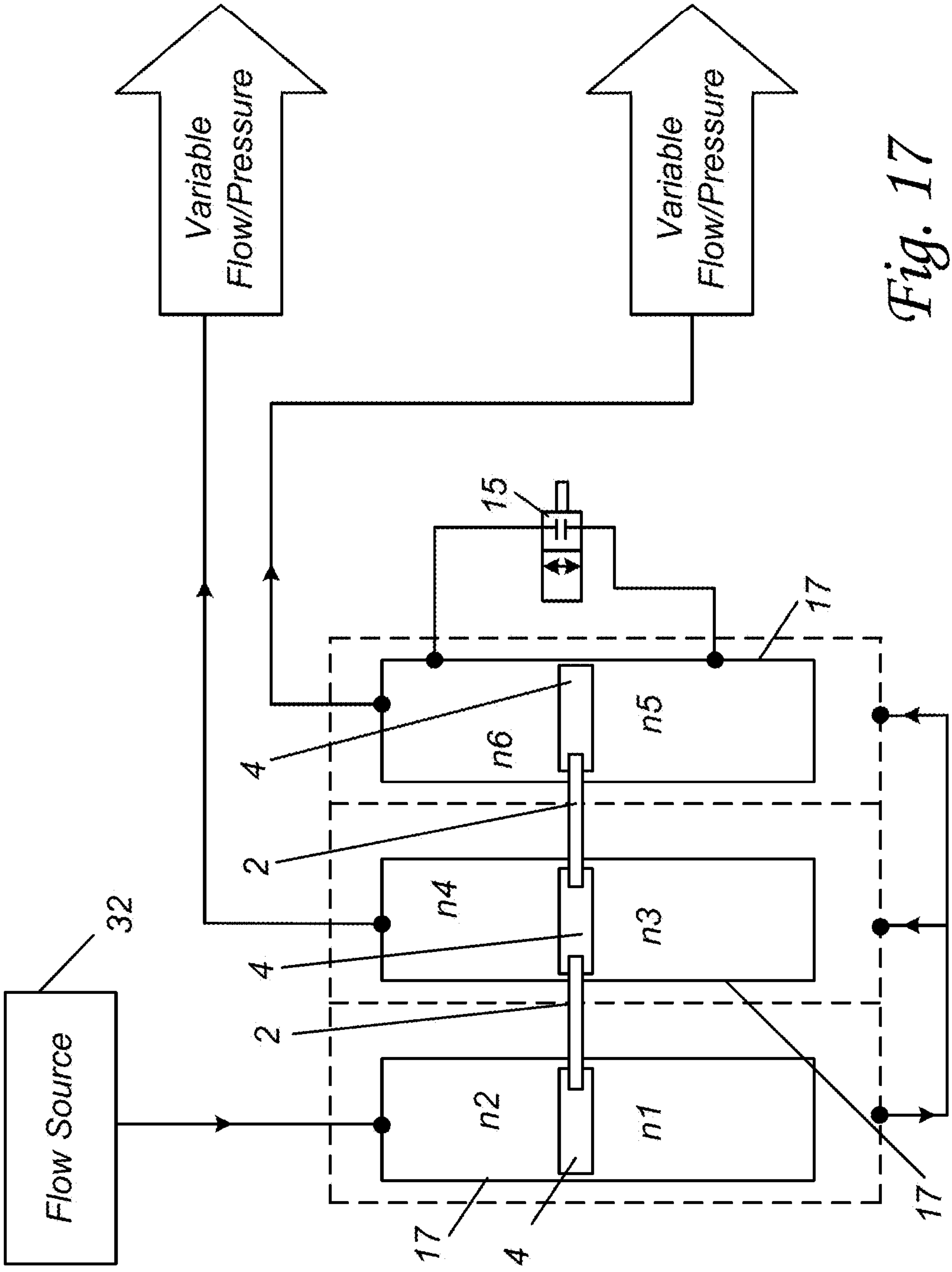
FIG. 17 illustrates one example of a mechanism configured as a flow splitter of a single fluid into two variable flows.

Referring to FIG. 17, there is illustrated one example of a mechanism configured as a flow splitter of a single fluid into two variable flows. This exemplary embodiments is similar to FIG. 16, except that both the flows go through separate bypass cylinders. This makes both outputs flow agnostic to conditions at either output. Additionally, if the fluid is compressible, changes in the cylinder diameters or the mechanical linkage 2 between pistons could be used to change the output flow and pressure. There is no dependent flow in this exemplary embodiment.

Figure 18:
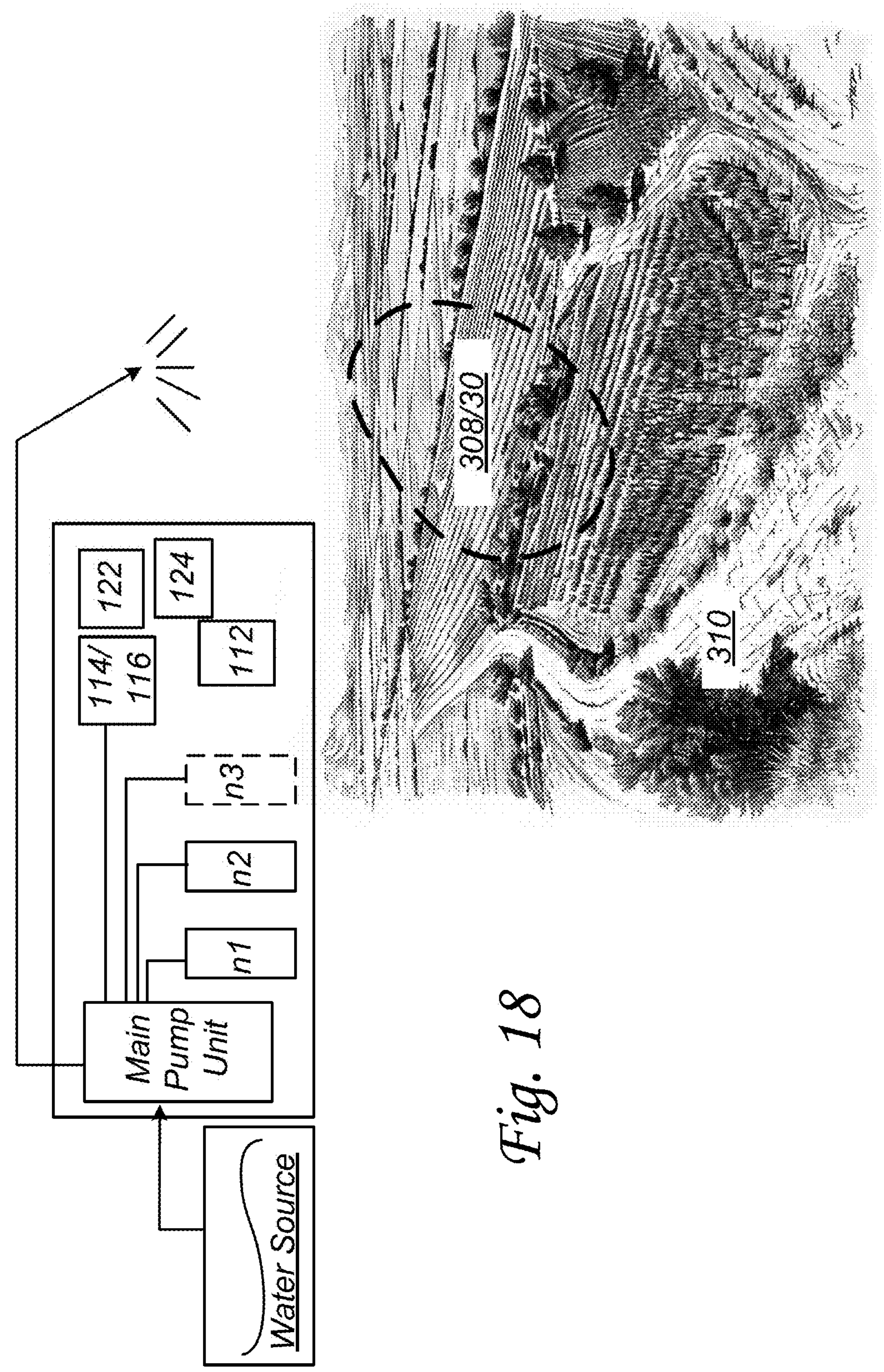
FIG. 18 illustrates one example of a chemigation application.
Figure 19:
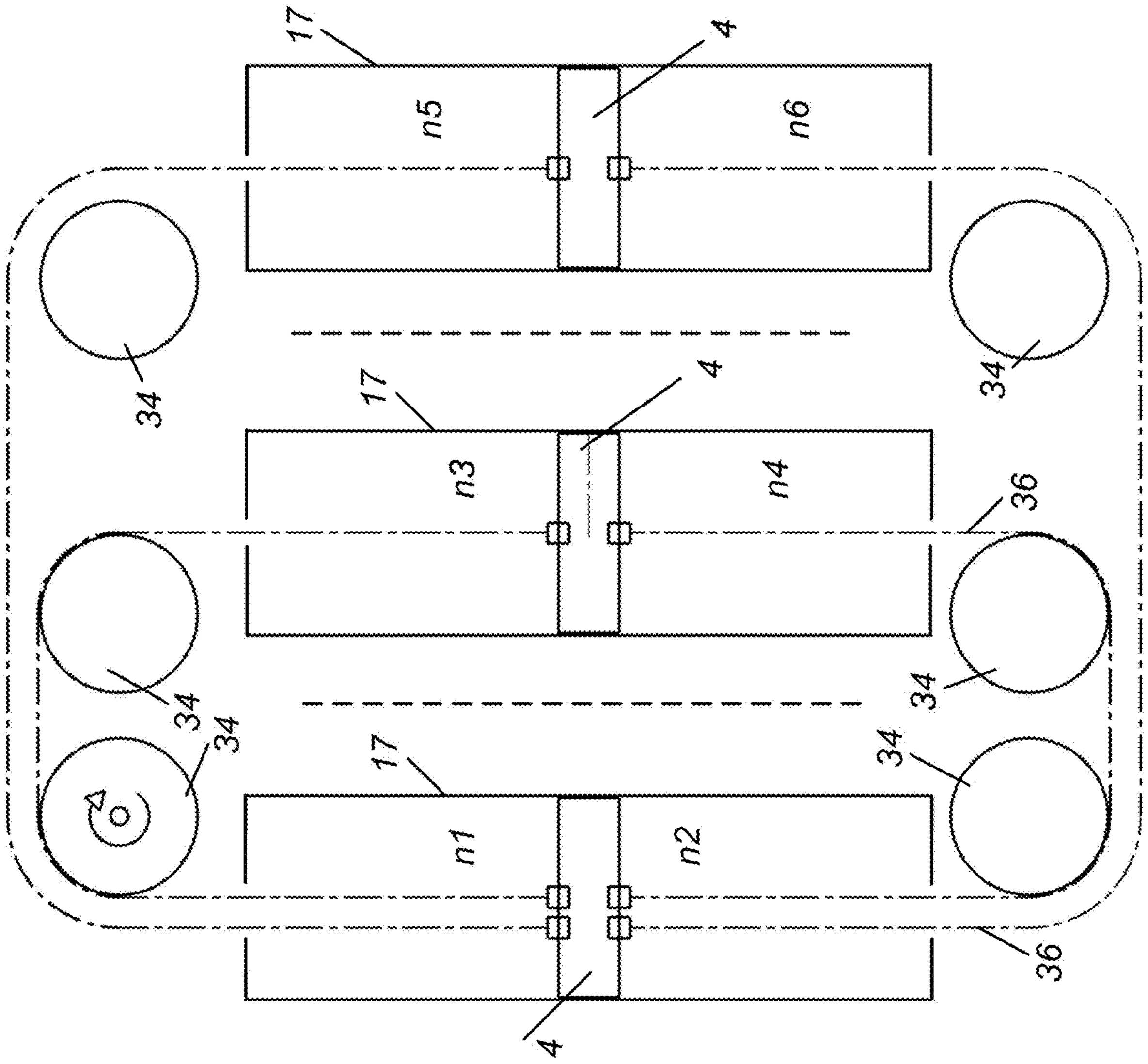
FIGS. 19 and 20A-20C illustrate examples of tension-coupled linkages using flexible mechanical transmission elements.

Referring to FIG. 18, there is illustrated one example of a chemigation application. In general, the term "chemigation" refers to the application of a chemical to crops through irrigation lines. In an exemplary embodiment, irrigation is from a stationary source, and the irrigation nozzle might be moving via a reel or other apparatus. A proportioning pump is used to add concentrates to the irrigation water flow. As required and/or desired the pressure pump, the proportioning pump (present invention), and the concentrate canisters can be moved site-to-site, but they are stationary. In applications where a well is assigned to a field, the pressure pump is part of the well and doesn't move.

Referring to FIGS. 19-20A-20C, there are illustrated tension-coupled linkages using flexible mechanical transmission elements 36, such as belts, cables, wires, or other suitable elements that can collectively be referred to as linkage 36 or individually as belt linkage 36, cable linkage 36, or wire linkage 36. For disclosure purposes, belts, cables, wires, or other suitable flexible transmission elements can collectively be referred to as flexible transmission elements 36

Figure 20A:
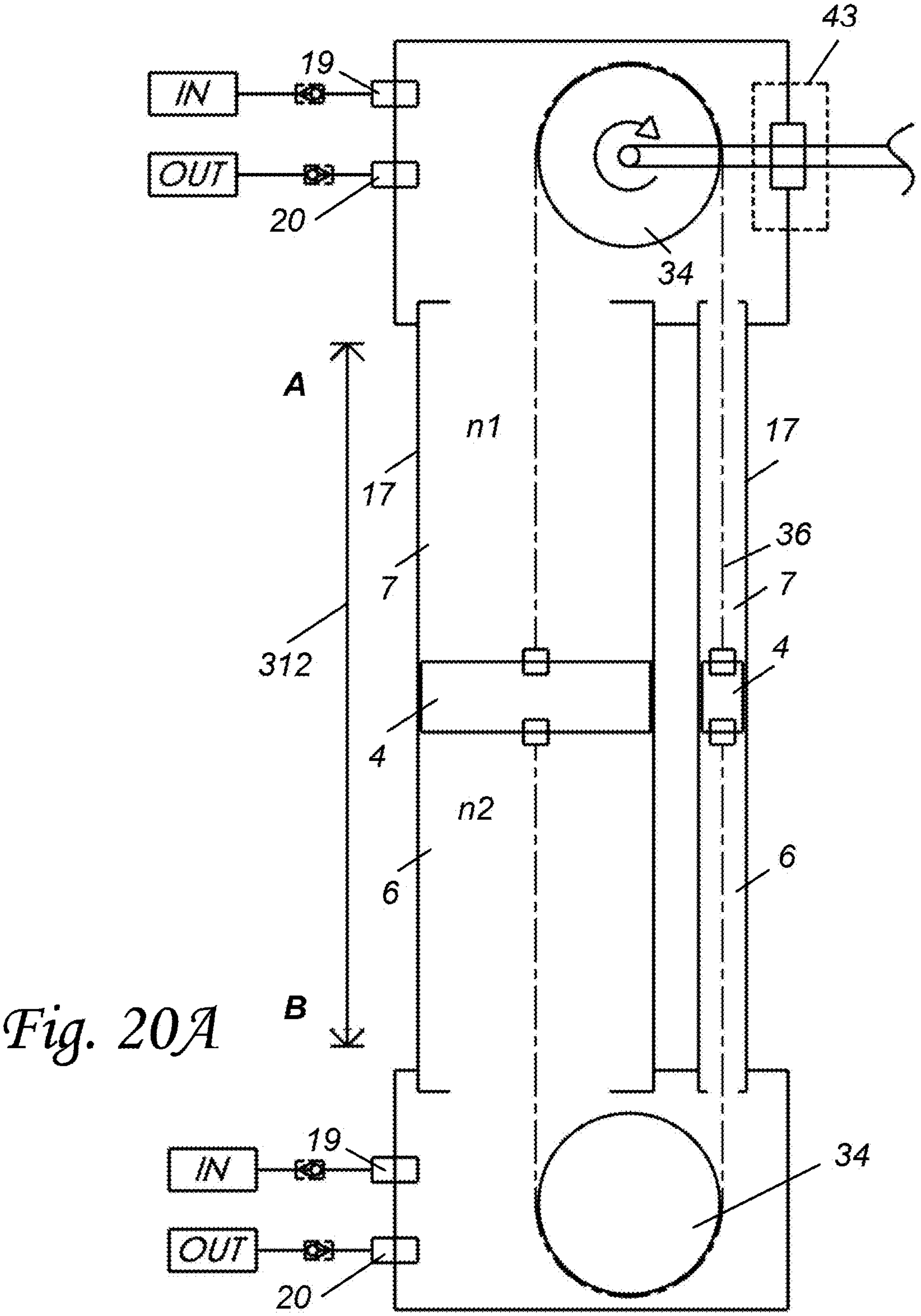
Figure 20B:
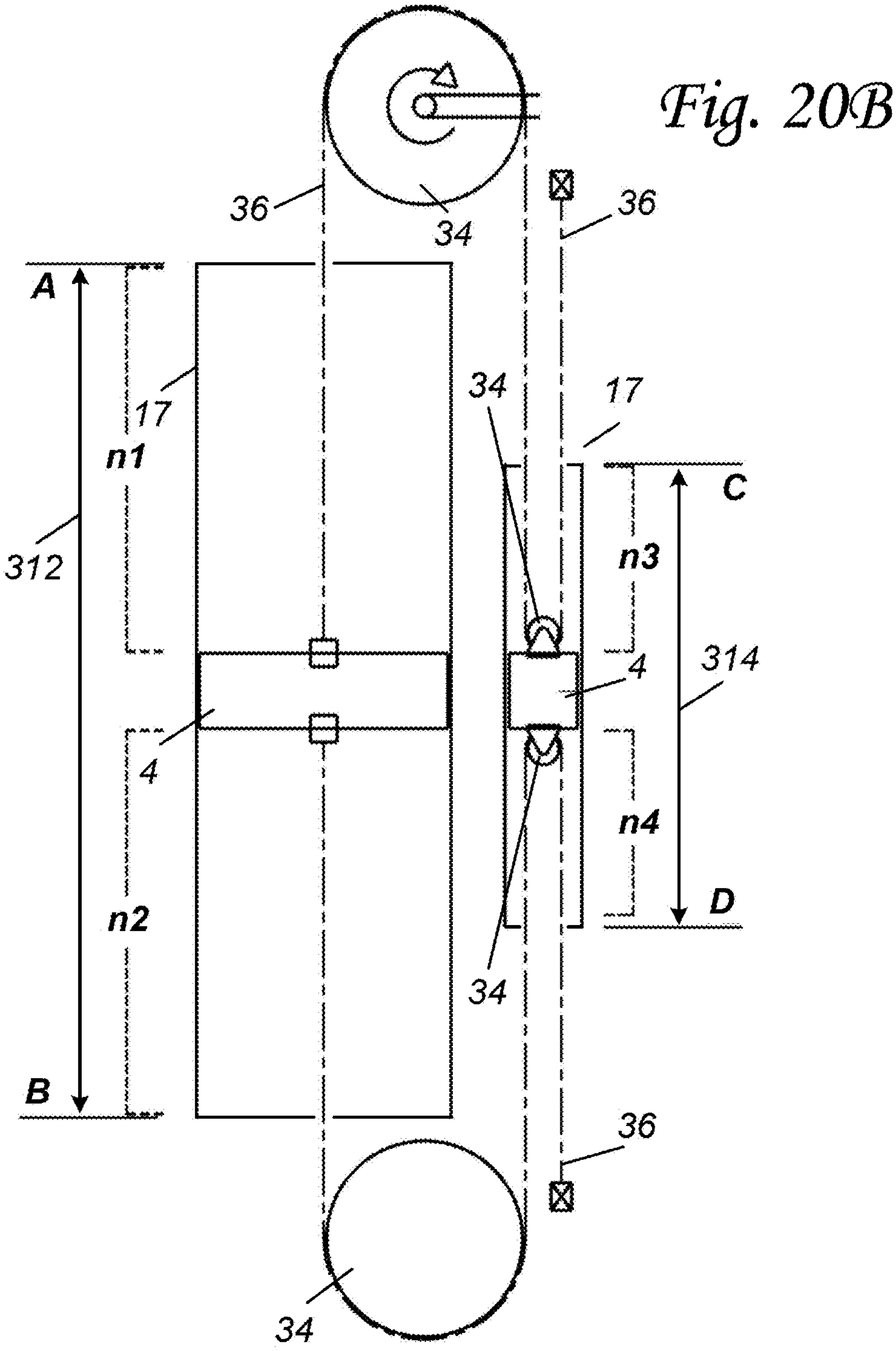
Figure 20C:
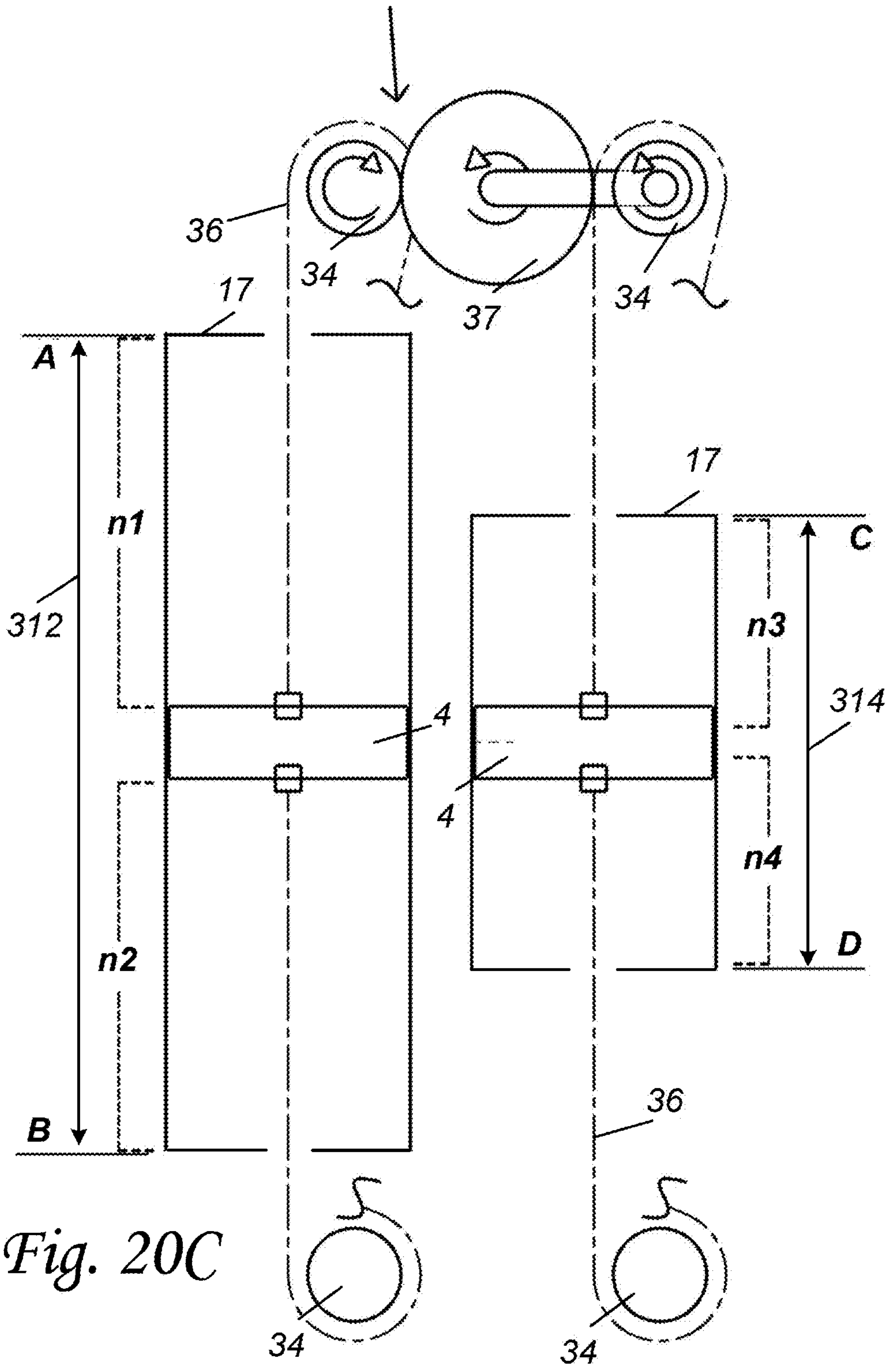

FIGS. 19 and 20A-20C differ in configuration, but each depicts linkage 36 being used to proportionally change the stroke of one piston 312 (A-B 312, FIG. 20B) relative to another 314 (C-D 314, FIG. 20B). In this regard, one of the pulleys 34 has a rotary encoder (displacement-determining device 120) that encodes position. Additionally, a linkage 36 can be used. Anything that will keep the piston 4 array coupled in tension, so long as the belt/wire/whatever can be made to reliably turn the pulley 34 that's being used to encode position.

The capabilities of the present invention can be implemented in software, firmware, hardware, or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention, can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment of the invention has been described, it will be understood that those skilled in the art, both now and in the future, may make various improvements and enhancements.

What is claimed is:

1. A method of dispensing flows of one or more fluids in varying ratios from a fixed ratio piston proportioning pump, the method comprising the steps of:

determining a desired volume of a fluid to dispense, wherein the fixed ratio piston proportioning pump comprises at least one cylinder, at least one piston, and at least one linkage that connects to at least one end of the at least one piston, wherein at least one chamber is formed, within the at least one cylinder and configured to hold the fluid, each of the at least one chamber comprises an ingress port and an egress port, wherein the at least one linkage is coupled to at least one motive force in a manner that displaces the at least one piston within the at least one cylinder;

determining a total piston displacement amount required to dispense the desired volume of the fluid;

initiating dispensing of the fluid from the egress port of at least one of the at least one chamber by setting at least one bypass valve to a first state;

measuring a piston displacement amount as the at least one piston moves to determine when the total piston displacement amount has been achieved; and bypassing the fluid at the ingress port or the egress port of the at least one chamber by setting the at least one bypass valve to a second state, preventing the dispensing of the fluid from the at least one chamber when the piston displacement amount reaches the total piston displacement amount while the at least one piston continues to move, and while each of the at least one chamber that remains unbypassed continues to dispense the fluid.

2. The method in accordance with claim 1, further comprising the step of:

configuring a size of each of the at least one chamber to form a chamber volume for each of the at least one chamber.

3. The method in accordance with claim 2, further comprising the step of:

mixing, in a ratiometric manner, based on the chamber volume of each of the at least one chamber, at least two separate streams of at least two different kinds of the fluid, by dispensing through the egress ports of more than one of the at least one chamber.

4. The method in accordance with claim 1, wherein more than one of the at least one piston is configured in the at least one cylinder and interconnected to the at least one linkage, forming the at least one chamber on each side of each of the at least one piston.

5. The method in accordance with claim 1, wherein more than one of the at least one linkage is operated by more than one of the at least one motive force, each of the at least one linkage is attached to at least one of the at least one piston in a separate one of the at least one cylinder.

6. The method in accordance with claim 1, further comprising the step of:

pressurizing at least a portion of the fixed ratio piston proportioning pump with the fluid by transitioning the at least one bypass valve between a first state and a second state without dispensing the fluid.

7. The method in accordance with claim 1, further comprising the step of:

communicating one or more operational parameters associated with the fixed ratio piston proportioning pump to a remote data processing resource or a computing device.

8. The method in accordance with claim 1, further comprising the step of:

receiving, by way of a communication interface, from a remote data processing resource or a computing device, the total piston displacement amount desired for dispensing the fluid.

9. The method in accordance with claim 1, further comprising the steps of:

receiving at a global positioning system (GPS) a plurality of geolocation data;

setting the at least one bypass valve to the first state, based on the plurality of geolocation data, to initiate dispensing of the fluid through one or more egress ports associated with one or more of the at least one chamber, the fluid is dispensed within a geofenced area defined by the plurality of geolocation data; and setting the at least one bypass valve to a second state, based on the plurality of geolocation data, to terminate dispensing of the fluid, wherein the fluid or a mixture of separate streams of at least two different kinds of the fluid is dispensed within the geofenced area.

10. The method in accordance with claim 1, wherein the at least one linkage comprises a flexible transmission element.

11. The method in accordance with claim 1, wherein the at least one motive force comprises a linear actuator.

12. A method of dispensing flows of one or more fluids in varying ratios from a fixed ratio piston proportioning pump, the method comprising the steps of:

configuring the size of each of more than one chamber to form a chamber volume for each of the more than one chamber wherein the fixed ratio piston proportioning pump comprises at least one of a cylinder, at least one piston, and at least one linkage that connects at one end to the at least one piston, wherein each of the more than one chamber is formed, within the at least one cylinder and configured to hold a fluid, each of the more than one chamber comprises an ingress port and an egress port, wherein the at least one linkage is coupled to at least one motive force in a manner that displaces the at least one piston within the at least one cylinder;

determining a desired volume of the fluid to dispense;

determining a total piston displacement amount required to dispense the desired volume of the fluid;

mixing, in a ratiometric manner based on each of the more than one chamber volume, at least two separate streams of at least two different kinds of the fluid, by setting at least one bypass valve to a first state, causing at least two separate streams of the fluid to be dispensed from more than one of the more than one chamber;

measuring a piston displacement amount as the at least one piston moves to determine when the total piston displacement amount has been achieved; and bypassing the fluid at the ingress port or the egress port of at least one of the more than one chamber by setting at the least one bypass valve to a second state, preventing dispensing of the fluid from one or more of the more than one chamber when the piston displacement amount reaches the total piston displacement amount while the at least one piston continues to move, and while each of the more than one chamber that remains unbypassed continues to dispense the fluid.

13. The method in accordance with claim 12, wherein more than one of the at least one piston is configured in the at least one cylinder and interconnected to a single one of the at least one linkage, forming at least one of the more than one chamber on each side of each of the at least one piston.

14. The method in accordance with claim 12, wherein more than one of the at least one linkage can be operated by more than one of the at least one motive force, each of the at least one linkage is attached to at least one of the at least one piston in a separate one of the at least one cylinder.

15. The method in accordance with claim 12, further comprising the step of:

repositioning, by way of at least one spring, the at least one piston to a neutral position or predetermined position, within the at least one cylinder, in the absence of force applied by the at least one linkage.

16. The method in accordance with claim 12, further comprising the step of:

communicating one or more operational parameters associated with the fixed ratio piston proportioning pump to a remote data processing resource or a computing device.

17. The method in accordance with claim 12, further comprising the step of:

receiving, by way of a communication interface, from a remote data processing resource or a computing device, the total piston displacement amount desired for dispensing the fluid.

18. The method in accordance with claim 12, further comprising the steps of:

receiving at a global positioning system (GPS) a plurality of geolocation data;

setting the at least one bypass valve to the first state, based on the plurality of geolocation data, to initiate dispensing of the fluid from at least one of the more than one chamber through one or more egress ports associated with one or more of the at least one chamber, the fluid is dispensed within a geofenced area defined by the plurality of geolocation data; and setting the at least one bypass valve to a second state, based on the plurality of geolocation data, to terminate dispensing of the fluid, wherein the fluid or a mixture of at least two separate streams of at least two different kinds of the fluid is dispensed within the geofenced area.

19. A method of dispensing flows of one or more fluids in varying ratios from a fixed ratio piston proportioning pump, the method comprising the steps of:

configuring the size of each of more than one chamber to form a chamber volume for each of the more than one chamber, wherein the fixed ratio piston proportioning pump comprises at least one of a cylinder, and at least one piston, each of the more than one chamber is formed within the at least one cylinder and configured to hold a fluid, each of the more than one chamber comprises an ingress port and an egress port, the at least one piston is displaced by injection of the fluid into at least one of the more than one chamber;

mixing, in a ratiometric manner based on the chamber volume of each of the more than one chamber, at least two separate streams of at least two different kinds of the fluid, by setting at least one bypass valve to a first state, causing at least two separate streams of the fluid to be dispensed from more than one of the more than one chamber; and bypassing the fluid at the ingress port or the egress port of at least one of the more than one chamber by setting the at least one bypass valve to a second state, preventing dispensing of the fluid from one or more of the more than one chamber while the at least one piston continues to move, and while each of the more than one chamber that remains unbypassed continues to dispense the fluid.

20. The method in accordance with claim 19, further comprising the step of:

limiting, mechanically, a total piston displacement amount, wherein a maximum chamber volume remains constant.

* * * * *